(12) United States Patent
Bhorkar et al.

(10) Patent No.: US 11,102,814 B2
(45) Date of Patent: Aug. 24, 2021

(54) DISCOVERY REFERENCE SIGNAL TRANSMISSION FOR LTE IN UNLICENSED BAND

(71) Applicant: Apple Inc., Cupertino, CA (US)

(72) Inventors: Abhijeet Bhorkar, Fremont, CA (US); Hwan-Joon Kwon, Santa Clara, CA (US); Christian Ibars Casas, Santa Clara, CA (US); Seunghee Han, San Jose, CA (US); Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 15/745,424

(22) PCT Filed: Dec. 24, 2015

(86) PCT No.: PCT/US2015/000496
§ 371 (c)(1),
(2) Date: Jan. 16, 2018

(87) PCT Pub. No.: WO2017/026985
PCT Pub. Date: Feb. 16, 2017

(65) Prior Publication Data
US 2018/0213561 A1 Jul. 26, 2018

Related U.S. Application Data

(60) Provisional application No. 62/204,941, filed on Aug. 13, 2015, provisional application No. 62/232,380, filed on Sep. 24, 2015.

(51) Int. Cl.
*H04W 74/08* (2009.01)
*H04L 5/00* (2006.01)
(Continued)

(52) U.S. Cl.
CPC ......... *H04W 74/0808* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS

2016/0073366 A1* 3/2016 Ng .................... H04W 48/12
370/329
2016/0330678 A1* 11/2016 Yoon .................... H04L 5/00
(Continued)

OTHER PUBLICATIONS

Office Action for European Patent Application No. 15841026.6, dated Jan. 9, 2019.
(Continued)

*Primary Examiner* — Gregory B Sefcheck
*Assistant Examiner* — Amarnauth G Persaud
(74) *Attorney, Agent, or Firm* — Sterne, Kessler, Goldstein & Fox P.LLC.

(57) ABSTRACT

Described are mechanisms for eNB support of DRS in LAA, in which DRS is transmitted at one or more DRS occasions within a DMTC window, subject to LBT. In some embodiments, an eNB may include hardware processing circuitry comprising an antenna port, a first circuitry, a second circuitry, and a third circuitry. The first circuitry may be operable to determine a DMTC window of a wireless communication channel. The second circuitry may be operable to initiate one or more CCA checks through an antenna coupled to the antenna port prior to a DRS occasion within a DMTC time window. The third circuitry may be operable to initiate a DRS transmission through the antenna within the DMTC window upon a CCA check of the set of one or more CCA checks sensing that the wireless communication
(Continued)

channel is idle. Also described are mechanisms for proactive support of DRS in LAA.

25 Claims, 15 Drawing Sheets

(51) Int. Cl.
   *H04W 48/16* (2009.01)
   *H04W 72/04* (2009.01)
   *H04L 27/00* (2006.01)
(52) U.S. Cl.
   CPC ......... *H04W 48/16* (2013.01); *H04W 72/044* (2013.01); *H04L 27/0006* (2013.01)

(56) References Cited

U.S. PATENT DOCUMENTS

| | | | |
|---|---|---|---|
| 2017/0019924 A1* | 1/2017 | Wang | H04L 5/005 |
| 2017/0048718 A1* | 2/2017 | Kim | H04W 56/0005 |
| 2017/0353866 A1* | 12/2017 | Gou | H04L 5/0091 |
| 2018/0084432 A1* | 3/2018 | Kwak | H04W 16/14 |
| 2018/0199376 A1* | 7/2018 | Kim | H04L 1/0001 |
| 2018/0227953 A1* | 8/2018 | Kusashima | H04J 1/00 |
| 2019/0230574 A1* | 7/2019 | Novlan | H04J 11/0023 |
| 2019/0364434 A1* | 11/2019 | Kwak | H04L 27/2613 |
| 2020/0260251 A1* | 8/2020 | Kim | H04W 4/06 |

OTHER PUBLICATIONS

International Preliminary Report on Patentability for International Patent Application No. PCT/US15/00496, dated Feb. 22, 2018.

3GPP; "3rd Generation Partnership Project; Technical Specification Group Radio Access Network; Study on Licensed-Assisted Access to Unlicensed Spectrum; (Release 13)", 3GPP Draft; Mobile Competence Center, France, Jun. 8, 2015.

International Search Report and Written Opinion for International Patent Application No. PCT/US2015/000496, dated May 10, 2016.

Nokia Networks: "On DRS Design for LTE LAA", 3GPP Draft; R1-152814, 3rd Generation Partnership Project (3GPP), Mobile Conference Centre; France, May 15, 2015.

3GPP,"3rd Generation Partnership Project; Technical Specification Group Radio Access Network; Evolved Universal Terrestrial Radio Access (E-UTRA); Multiplexing and channel coding (Release 8)", 3GPP TS 36.212 V8.1.0; Nov. 2007.

ETSI, "Broadband Radio Access Networks (BRAN); 5 GHz highperformance RLAN; Harmonized EN covering the essential requirements of article 3.2 of the R&TTE Directive", ETSI EN 301 893; v1.7.2; Harmonized European Standard; Jul. 2014.

Panasonic, "DRS design for LAA", 3 GPP Draft; R1-152692; vol. RAN WG1; Fukuoka, Japan, May 15, 2015.

Office Action for European Patent Application No. 15841026.6, dated Aug. 14, 2019.

* cited by examiner

DISCOVERY REFERENCE SIGNAL TRANSMISSION FOR LTE IN UNLICENSED BAND

CLAIM OF PRIORITY

The present application is a National Stage Entry of, and claims priority to, PCT Application Ser. No. PCT/US15/00496, filed on 24 Dec. 2015 and entitled "Discovery Reference Signal Transmission For LTE In Unlicensed Band", which claims priority under 35 U.S.C. § 119(e) to U.S. Provisional Patent Application Ser. No. 62/204,941 filed Aug. 13, 2015 and entitled "Discovery Reference Signal Transmission For LTE In Unlicensed Band," and also claims priority under 35 U.S.C. § 119(e) to U.S. Provisional Patent Application Ser. No. 62/232,380 filed Sep. 24, 2015 and entitled "Discovery Reference Signal Transmission For LTE In Unlicensed Band," all of which are herein incorporated by reference in their entirety.

BACKGROUND

The 3rd Generation Partnership Project (3GPP) develops and releases specifications for wireless technology, including Long-Term Evolution (LTE) and LTE-Advanced wireless technologies. Among other things, the 3GPP specifications describe User Equipment (UE) devices, such as personal cellular telephones. The 3GPP specifications also describe Macro Enhanced/Evolved Universal Mobile Telecommunications System (UMTS) Terrestrial Radio Access Network (E-UTRAN) Node B (eNB) devices, such as cellular phone towers and associated devices.

Some eNBs may be Secondary Cells (SCells) in a cellular wireless network. SCells that are not active for any UEs in the network may use unnecessary power, and can in theory be turned off. Once turned off, however, an SCell may benefit from the ability to turn back on for the network to serve UEs in its cell. In Release 12 of the 3GPP specifications, Discovery Reference Signals (DRS) are provided to support turning SCells off and on. DRS include Primary Synchronization Signals (PSS), Secondary Synchronization Signals (SSS), Cell-Specific Reference Signals (CRS), and (optionally) Channel State Information Reference Signals (CSI-RS). SCells that are not activated for any UE may be turned off except for the periodic transmission of DRS.

Meanwhile, 3GPP also supports License Assisted Access (LAA), in which 3GPP devices make use of bandwidth that is currently unused or otherwise available, but which is unlicensed (i.e., not licensed for use by 3GPP devices). Some regions have imposed Listen-Before-Talk (LBT) requirements upon the use of unlicensed spectrum by 3GPP devices. Essentially, under LBT requirements, an eNB attempting to use a portion of unlicensed spectrum should first sense—or "listen" to—the portion of the spectrum in question to ensure that it is truly unused; then, if the sensing has confirmed that the portion of the spectrum is unused, the eNB may transmit—or "talk"—using that portion of the spectrum.

In some regions, LBT is not mandated to be performed before short control transmissions (such as DRS), while in other regions, LBT should be performed before such transmissions. Accordingly, in order to fully support both DRS and LAA, carriers that may make use of unlicensed spectrum (such as SCell transmissions using LAA) should use DRS subject to LBT requirements.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
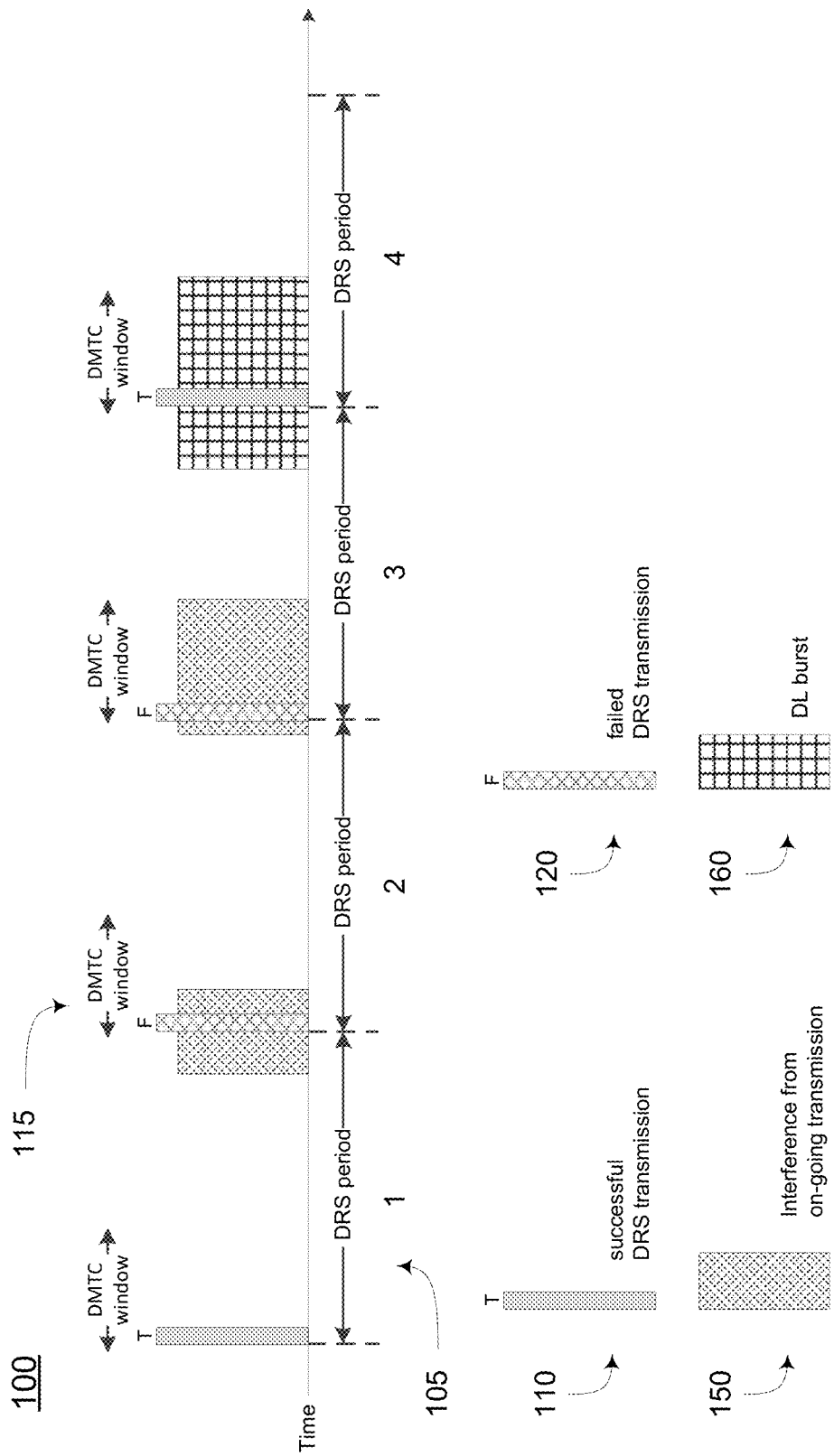
FIG. 1 illustrates an embodiment of a scenario in which a Macro Enhanced/Evolved Universal Mobile Telecommunications System (UMTS) Terrestrial Radio Access Network (E-UTRAN) Node B (eNB) attempts to transmit Discovery Reference Signals (DRS) at a predetermined DRS occasion within a DRS period.

Various mechanisms for eNB support of DRS in accordance with LAA specifications are described below. These mechanisms correspond to different scenarios in which an eNB undertakes LBT before a DRS transmission (e.g., in order to make DRS subject to LBT). These mechanisms may advantageously optimize DRS in unlicensed-spectrum scenarios, and may thereby improve system level performance.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In order to support eNB use of DRS, UEs are configured with a Discovery Measurement Timing Configuration (DMTC) window within which a UE can expect any transmitted DRS to be received. A UE can also expect DRS transmissions to be periodic, with the duration between successive transmissions set to 40 ms, 80 ms, or 160 ms.

DRS transmissions occur at DRS occasions within a DMTC window, and may occur at various time-offsets within the DMTC window. More specifically, DRS occasions may occur on predetermined sub-frames within a DMTC window In a first type of mechanism for eNB support of DRS in LAA, DRS is transmitted at one or more DRS occasions within a DMTC window, subject to LBT. By providing a DRS protocol subject to LBT, this first type of mechanism may advantageously support SCells seeking to make use of unlicensed spectrum.

In a first example of transmitting DRS at DRS occasions within a DMTC window, FIG. 1 illustrates an embodiment of a scenario in which a Macro Enhanced/Evolved Universal Mobile Telecommunications System (UMTS) Terrestrial Radio Access Network (E-UTRAN) Node B (eNB) attempts to transmit Discovery Reference Signals (DRS) at a predetermined DRS occasion within a DRS period. FIG. 1 shows a timeline for a scenario 100 having a plurality of DRS periods 105 (labelled 1, 2, 3, and 4). These DRS periods 105 may have a duration of 40 ms, 80 ms, or 160 ms.

At the beginning of each DRS period 105 is a DMTC window 115. In this first example, the transmitting eNB is configured to attempt DRS transmission at one DRS occasion within each DMTC window 115. More specifically, as shown, the DRS occasion is at the beginning of each DMTC window 115 (and therefore at the beginning of each DRS period 105). In other embodiments, however, the DMTC window 115 may occur at any time-offset within a DRS period 105, and the DRS occasion may occur at any time-offset within a DMTC window 115.

In scenario 100, there is no interference at the time of the DRS occasion in the first DRS period 105 (e.g., at the beginning of the first DRS period 105). As a result, when the eNB employs LBT before attempting a DRS transmission at that DRS occasion, it will not sense any interference, and it may thereafter successfully transmit the DRS. (LBT mechanisms that may be employed by the eNB will be discussed further below.) Accordingly, scenario 100 shows a successful DRS transmission 110 at the beginning of the first DRS period 105.

Proceeding, scenario 100 includes two periods of interference 150 from on-going transmissions, one extending between the first and second DRS periods 105, and one extending between the second and third DRS periods 105. As a result, when the eNB employs LBT before attempting a DRS transmission at the DRS occasions for the second and third DRS periods 105 (e.g., at the beginning of the second and third DRS periods 105), it will sense interference 150 at each DRS occasion, resulting in two failed DRS transmissions 120.

Finally, scenario 100 includes a period of downlink (DL) burst 160 extending between the third and fourth DRS periods 105. In this case, the eNB is already transmitting in the DL burst, and there is accordingly no necessity to employ LBT to sense for interference from other sources. As a result, the eNB may insert a successful DRS transmission 110 within DL burst 160.

Figure 2:
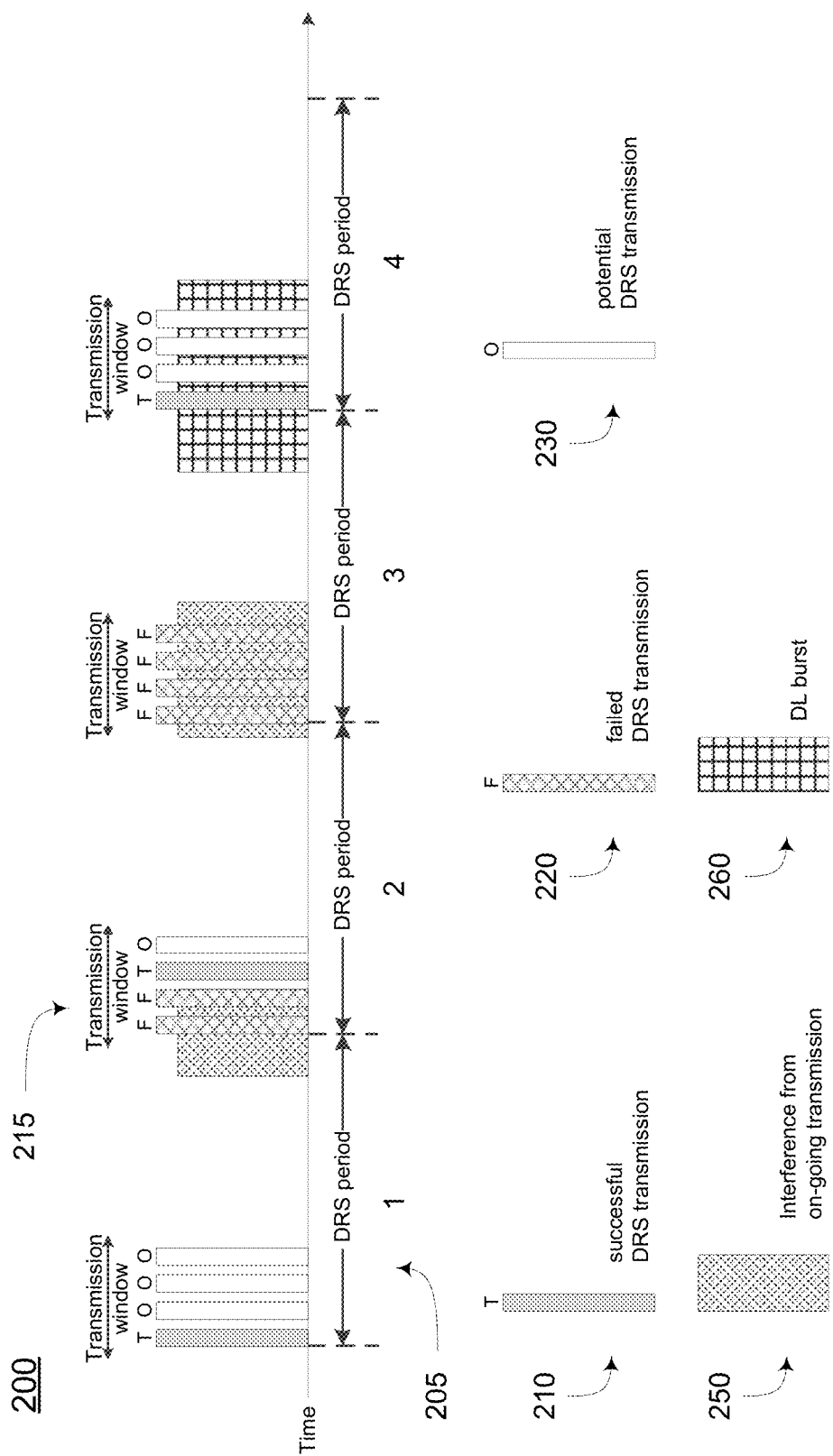
FIG. 2 illustrates an embodiment of a scenario in which an eNB attempts to transmit DRS at a series of consecutive DRS occasions within a DRS period.

In a second example of transmitting DRS at DRS occasions within a DMTC window, FIG. 2 illustrates an embodiment of a scenario in which an eNB attempts to transmit DRS at a series of consecutive DRS occasions within a DRS period. FIG. 2 shows a timeline for a scenario 200 having a plurality of DRS periods 205 (labeled 1, 2, 3, and 4). As in FIG. 1, these DRS periods 105 may have a duration of 40 ms, 80 ms, or 160 ms.

At the beginning of each DRS period 105 is a DMTC window. In this second example, the transmitting eNB is configured to attempt DRS transmission in multiple consecutive DRS occasions within a transmission window 215 in each DMTC window, more specifically at a predetermined number of consecutive sub-frames within transmission window 215. In some embodiments, the eNB is configured to attempt DRS transmission for each subframe within transmission window 215. The eNB is configured to attempt DRS transmission until a successful DRS transmission 210 occurs, after which the eNB makes no further attempts and leaves the remaining DRS occasions as only potential DRS transmissions 230.

For example, as illustrated, the transmitting eNB is configured to attempt DRS transmissions in each of four consecutive subframes at the beginning of DRS period 105, and to hold off on further DRS transmission as soon as it has successfully transmitted a DRS within transmission window 215. Although transmission window 215 is shown at the beginning of each DRS occasion period, in other embodiments, the transmission window 215 (and the underlying DMTC window) may occur at any time-offset within a DRS period 205.

So, at the time of the first transmission window 215 in the first DRS period 205, there is no interference. When the eNB employs LBT before attempting a DRS transmission for each DRS occasion within the first transmission window 215, it may not sense any interference at the time of the first DRS occasion within the transmission window, and it may therefore successfully transmit the DRS at that time. The eNB may not attempt DRS transmission in the remaining DRS occasions within the first transmission window 215. Accordingly, scenario 200 shows a successful DRS transmission 210 followed by three potential DRS transmissions 230.

Scenario 200 includes two periods of interference 250 from on-going transmissions, similar to those in scenario 100. In the second DRS period 205, the eNB employs LBT before attempting a DRS transmission for a series of consecutive DRS occasions (e.g., a series of consecutive subframes) within transmission window 215. Before the first two DRS occasions in transmission window 215, the eNB senses interference 250, resulting in two corresponding failed DRS transmissions 220. However, before the third DRS occasion within transmission window 215, the eNB does not sense any interference, resulting in a successful DRS transmission 210, followed by one potential DRS transmission 230.

In comparison, in the third DRS period 205, the eNB senses interference 250 before all of the DRS occasions in the third transmission window 215, resulting in four failed DRS transmissions 220.

As in scenario 100, scenario 200 includes a period of DL (downlink) burst 260 extending between the third and fourth DRS periods 205. In the fourth transmission window 215, since the eNB is already transmitting in DL burst 260, and since DRS should merely be transmitted once, the eNB may insert a successful DRS transmission 210 within DL burst 260, followed by three potential DRS transmissions 230.

Figure 3:
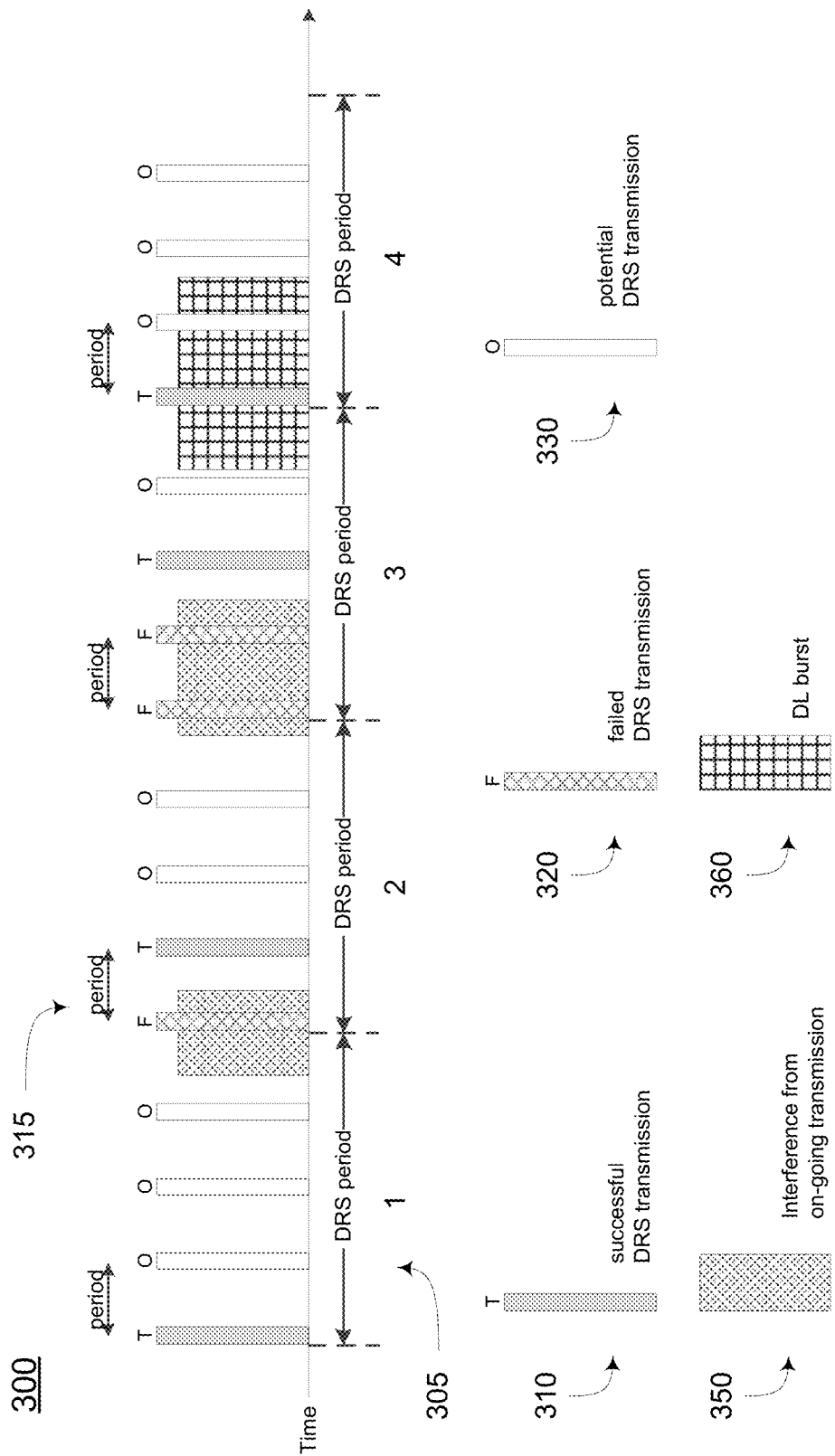
FIG. 3 illustrates an embodiment of a scenario in which an eNB attempts to transmit DRS at a series of periodically spaced DRS occasions within a DRS period.

In a third example of transmitting DRS at DRS occasions within a DMTC window, FIG. 3 illustrates an embodiment of a scenario in which an eNB attempts to transmit DRS at a series of periodically spaced DRS occasions within a DRS period. FIG. 3 shows a timeline for a scenario 300 having a plurality of DRS periods 305 (labeled 1, 2, 3, and 4). As in FIGS. 1 and 2, these DRS periods 305 may have a duration of 40 ms, 80 ms, or 160 ms.

In this example, each DRS period 305 includes a DMTC window that spans over multiple periodically spaced subframes. The transmitting eNB is configured to attempt DRS transmission at multiple DRS occasions spaced by a period 315. The eNB accordingly attempts DRS transmission at one DRS occasion, then the next DRS occasion one period 315 away, and so on until a successful DRS transmission 310 occurs (after which the eNB will not attempt further DRS transmissions within that DRS period 305), or until all DRS transmissions have failed. The DMTC window within which all the DRS occasions occur may itself fall within any portion of DRS periods 305.

So, in the first DRS period 305, the eNB does not sense any interference when it employs LBT before attempting DRS transmission, and as a result the first DRS period 305 contains a successful DRS transmission 310 followed by three potential DRS transmissions 330. As with scenarios 100 and 200, scenario 300 includes two periods of interference 350 from on-going transmissions. In the second DRS period 305, the eNB employing LBT observes interference 350 that causes one failed DRS transmission 320, while in the third DRS period 305 the eNB observes interference 350 that causes two failed DRS transmissions 320. However, due to the periodically spaced DRS occasions, in both cases the eNB is eventually able to sense a DRS occasion having no interference 350, and accordingly both the second DRS period 305 and the third DRS period 305 include a successful DRS transmission 310 followed by one or more potential DRS transmissions 320.

As with scenario 100 and scenario 200, scenario 300 includes a period of DL burst 360 extending from the third DRS period 305 to the fourth DRS period 305. As with scenario 200, since the eNB is already transmitting in DL burst 360, and since the eNB should merely transmit one DRS within the fourth DRS period 305, the eNB may insert a successful DRS transmission 310 within DL burst 360, followed by three potential DRS transmissions 330.

In each of FIGS. 1-3 above, an eNB employs an LBT mechanism before attempting to transmit DRS. There are a few LBT mechanisms that an eNB may employ before attempted DRS transmissions.

In some embodiments, a Clear Channel Assessment (CCA) check is performed as an LBT mechanism before a DRS occasion. This CCA check may be performed for each DRS occasion at which the eNB attempts a DRS transmission, so if multiple DRS occasions exist in a DRS period, this CCA check may be performed before each DRS occasion (until a successful DRS transmission).

In such embodiments, an eNB may sense the channel on which a DRS transmission is to be attempted at some time C before the start of a DRS occasion (which may be just before the start of a DMTC window), where C is the amount of time conducive to performing the sensing operation. C might be set to 34 μsec, for example, and the eNB may sense the channel 34 μsec before the start of a DRS occasion.

When sensing, the eNB may use an Energy Detection (ED) threshold between −62 dBm and −67 dBm, but some embodiments may us another ED threshold, such as an ED threshold that is the same value as an ED threshold used for DL burst transmissions. If the energy sensed on the channel (during the time C) is less than the ED threshold, the channel may be judged to be idle and therefore available for the eNB's DRS transmission, and the eNB may transmit DRS at the subsequent DRS occasion.

In some embodiments, both a CCA check and a reservation-signal transmission are performed as LBT before a DRS occasion. This CCA check and reservation signal may be performed for each DRS occasion at which the eNB attempts a DRS transmission. Thus, if multiple DRS occasions exist in a DRS period, the CCA check and reservation-signal may be performed before each DRS occasion (until a successful DRS transmission).

In such embodiments, an eNB may sense the channel on which a DRS transmission is to be attempted at some time C+R before the start of a DRS occasion, where C is the amount of time to perform the sensing operation (which may be 34 μsec, for example), and R is a period of time for transmission of a reservation signal. The eNB may sense the channel sufficiently in advance of the DRS occasion to allow for both the amount of time C and the amount of time R.

When sensing, the eNB may use an ED threshold between −62 dBm and −67 dBm, but some embodiments may us another ED threshold, such as an ED threshold that is the same value as an ED threshold used for DL burst transmissions. If the energy sensed on the channel (during the time C) is less than the ED threshold, the channel may be judged to be idle and therefore available for the eNB's DRS transmission, and the eNB may transmit DRS at the DRS occasion. If the start of the DRS occasion and the end of the LBT are not aligned, the eNB may transmit a reservation signal in order to reserve the medium and prevent other potential transmitters from accessing the channel.

In some embodiments, an extended CCA and a potential reservation-signal transmission are performed as an LBT mechanism before a DRS occasion. This extended CCA and potential-reservation-signal transmission may be performed each DRS occasion (until a successful DRS transmission).

In such embodiments, an eNB may sense the channel on which a DRS transmission is to be attempted at some time N before the start of a DRS occasion, where N is a random period of time generated uniformly between $R_1$ ms and $R_2$ ms. $R_1$ may be set to 0 ms and $R_2$ may be set to 1 ms, for example, such that N may be a random period of time between 0 ms and 1 ms. The eNB may sense the channel sufficiently in advance of the DRS occasion to allow for the amount of time N.

When sensing, the eNB may use an ED threshold between −62 dBm and −67 dBm, but some embodiments may us another ED threshold, such as an ED threshold that is the same value as an ED threshold used for DL burst transmissions. If the energy sensed on the channel is such that the channel is deemed to be idle based on the extended CCA procedure defined in 3GPP TR 36.889 V13.0.0 (2015-06), eNB may transmit DRS at the DRS occasion. If the start of the DRS occasion and the end of the LBT are not aligned, the eNB may transmit a reservation signal in order to reserve the medium and prevent other potential transmitters from accessing the channel.

FIGS. 1-3 above illustrate embodiments of a first type of mechanism for eNB support of DRS in LAA, in which DRS is transmitted at one or more DRS occasions within a DMTC window, subject to LBT. In a second type of mechanism for eNB support of DRS in LAA, DRS may be transmitted outside of a DMTC window, within a downlink burst. As with the first type of mechanism, by providing a DRS protocol subject to LBT, this second type of mechanism may advantageously support SCells seeking to make use of unlicensed spectrum.

Figure 4:
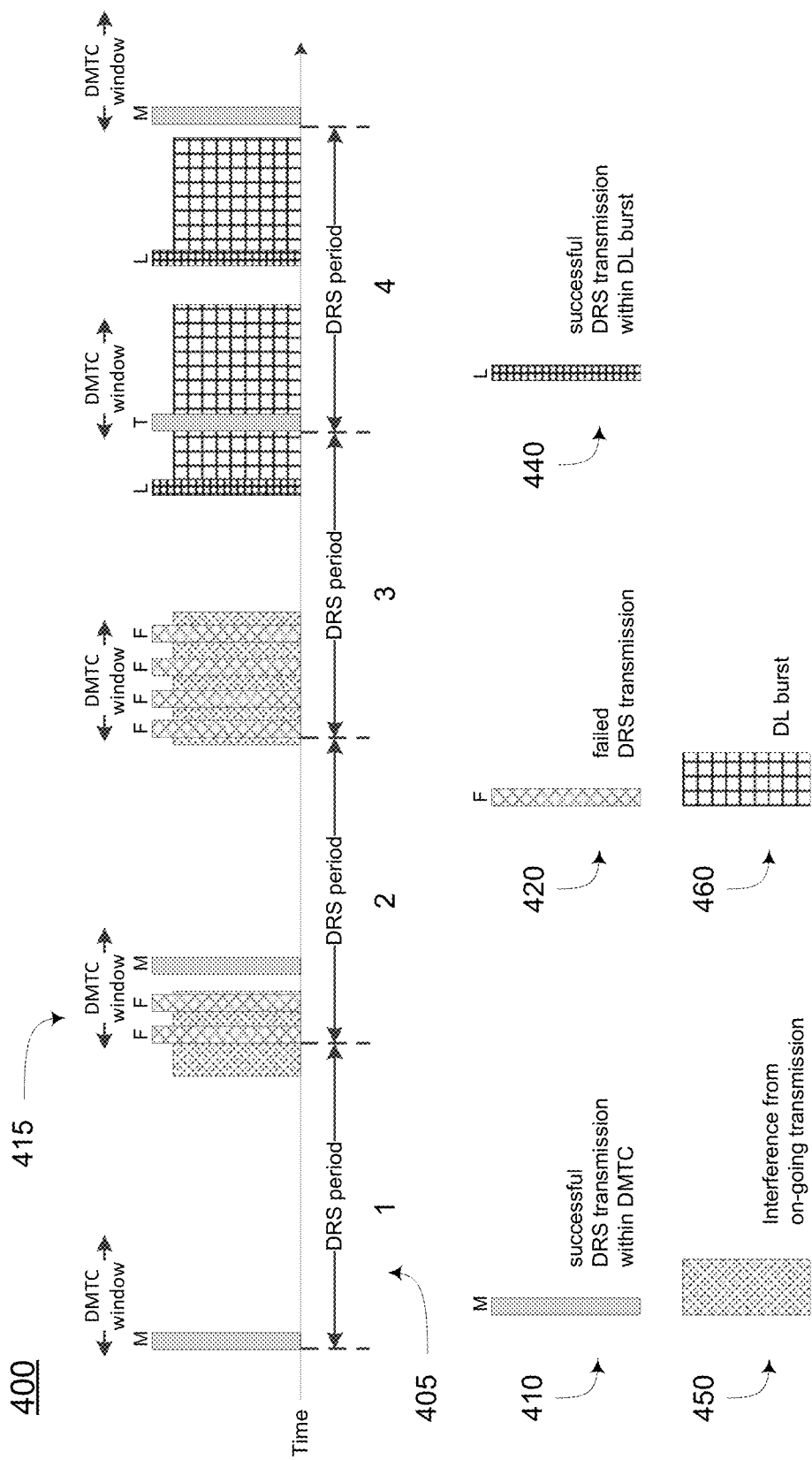
FIG. 4 illustrates an embodiment of a scenario in which an eNB transmits DRS within a downlink (DL) burst and outside of a Discovery Measurement Timing Configuration (DMTC) window.

FIG. 4 illustrates an embodiment of a scenario in which an eNB transmits DRS within a DL burst and outside of a DMTC window. FIG. 4 shows a timeline for a scenario 400 having a plurality of DRS periods 405 (labeled 1, 2, 3, and 4). As with FIGS. 1-3, these DRS periods 405 may have a duration of 40 ms, 80 ms, or 160 ms. (Not shown in FIG. 4 are various potential DRS transmissions following successful DRS transmissions within a DRS period.)

Scenario 400 begins in a manner substantially similar to scenario 405, and includes various successful DRS transmissions 410 (within DMTC windows 415) and failed DRS transmissions 420, depending upon the presence of interference 450 from on-going transmissions. Scenario 400 is similar to scenario 200 until the end of the third DRS period 405, which depicts a successful DRS transmission 440 within DL burst 460, despite being outside DMTC window 415 for the third DRS period 405. Accordingly, in some embodiments, an eNB may transmit DRS within a DL burst, even outside a DMTC window for a particular DRS period. In such embodiments, the DRS transmission may be embedded in the first normal subframe of the DL burst.

Furthermore, DRS transmissions within DMTC windows and DRS transmissions within DL bursts are not mutually exclusive. For example, various embodiments of eNBs may support DRS transmissions within DMTC windows, or DRS transmissions within DL bursts, or both.

An eNB may also use other mechanisms to proactively support DRS in LAA. In a first type of proactive mechanism to support DRS in LAA, an eNB may restrict itself to use a portion of a DMTC window based upon its Physical Cell ID. This first type of proactive mechanism may advantageously facilitate interoperation of multiple SCells in LAA.

Figure 5:
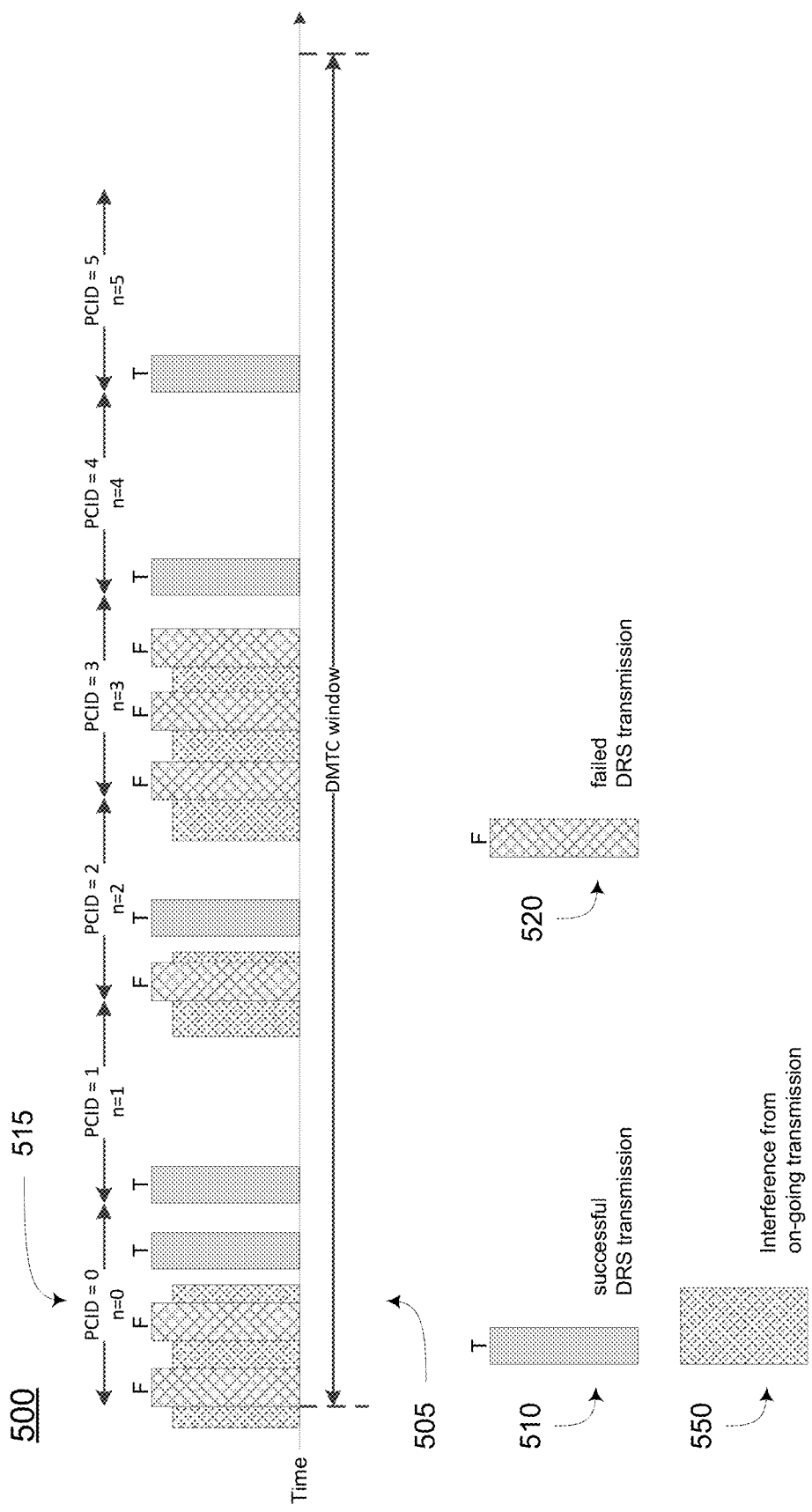
FIG. 5 illustrates an embodiment of a scenario in which an eNB attempts to transmit DRS subject to Listen-Before-Talk (LBT) requirements based upon a DMTC start time derived from a Physical Cell ID (PCID).

FIG. 5 illustrates an embodiment of a scenario in which an eNB attempts to transmit DRS subject to Listen-Before-Talk (LBT) requirements based upon a DMTC start time derived from a Physical Cell ID (PCID). FIG. 5 shows a timeline for a scenario 500 having a DMTC window 505. In scenario 500, multiple eNBs of the same operator having different PCIDs are configured to transmit DRS. Each eNB uses a DMTC start time location within DMTC window 505 based on its PCID. The number N of different DMTC start time locations that are available is limited by the size of DMTC window 505 and a DRS search interval, which is a period of time after which further DRS transmission attempts will be deferred to the next DRS period if DRS cannot be transmitted in the current DRS period.

$$\text{number } N \text{ of } DMTC \text{ start time locations} = \frac{DMTC \text{ window (time)}}{DRS \text{ search interval (time)}}$$

For purposes of FIG. 5, the size of DMTC window 505 is 20 ms, and the search interval is 3 ms. Therefore, dropping any fractions, the number N of DMTC start time locations within the DMTC window is 6.

Within DMTC window 505, the DMTC start time within DMTC window 505 for each eNB is then set to another number n multiplied by the length of the DRS search interval, where n is derived from the number N of DMTC start time locations and the PCID for that eNB. In essence, the number n is the remainder of dividing each eNB's PCID by the number N.

$n=\text{mod}(\text{PCID},N)$

In FIG. 5, for example, there are six DRS search intervals 515 within DMTC window 505. So, any eNB for which mod(PCID, 6) is "0" will have a DRS search interval 515 starting at 0 ms within DMTC window 505; any eNB for which mod(PCID, 6) is "1" will have a DRS search interval 515 starting at 3 ms; any eNB for which mod(PCID, 6) is "2" will have a DRS search interval 515 starting at 6 ms; and so on.

Within any DRS search interval 515, an eNB may then employ the various mechanisms for support of DRS in LAA discussed above. For example, as shown in FIG. 5, the eNB having the first DRS search interval 515 has sensed interference 550, causing a failed DRS transmission 520. However, the eNB is employing one of the above mechanisms to attempt the DRS transmission on several DRS occasions, and although the first two DRS transmission attempts were failed DRS transmissions 520, the third attempt is a successful DRS transmission 510. The eNB having the third DRS search interval 515 has similarly experienced a failed DRS transmission 520 followed eventually by a successful DRS transmission 520. The eNB having the fourth DRS search interval 515 experiences only failed DRS transmissions 520, and will have to wait for the next DMTC window (in the next DRS period) to attempt its next DRS transmission.

In a second type of proactive mechanism to support DRS in LAA, an eNB aware of possible DRS transmission from other LAA eNBs may puncture the last few Orthogonal Frequency Division Multiplexing (OFDM) symbols of a Physical Downlink Shared Channel (PDSCH) transmission to enable LBT procedures of other eNBs to succeed and lead to DRS transmissions. As with the first type of proactive mechanism, this second type of proactive mechanism facilitates interoperation of multiple SCells in LAA.

Figure 6:
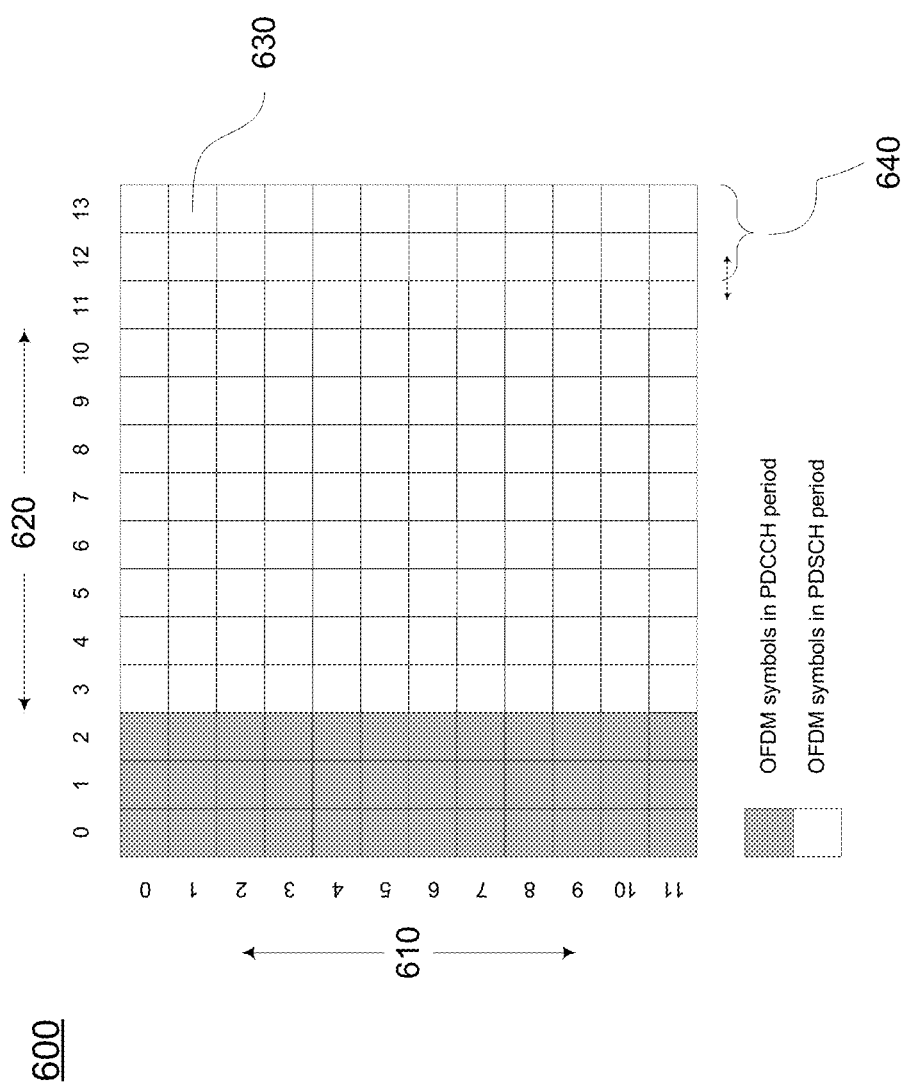
FIG. 6 illustrates an embodiment of a resource block transmitted by an eNB to accommodate other DRS transmissions in a network.

FIG. 6 illustrates an embodiment of a resource block transmitted by an eNB to accommodate other DRS transmissions in a network. In FIG. 6, a downlink resource block 600 is composed of a plurality of subcarriers 610 in the frequency domain and a plurality of OFDM symbols 620 in the time domain. For each subcarrier 610 and each OFDM symbol 620, resource block 600 has a resource element 630.

OFDM symbols 0 through 2 are OFDM symbols in a Physical Downlink Control Channel (PDCCH) period. Depending upon the position of resource block 600 in the frequency and time domains, resource elements 630 in OFDM symbols 0 through 2 may bear PDCCH symbols. Similarly, OFDM symbols 3 through 13 are OFDM symbols in a PDSCH period, and depending upon the position of resource block 600 in the frequency and time domains, resource elements 630 in OFDM symbols 3 through 13 may bear PDSCH symbols.

In some embodiments, an LAA-capable eNB may be aware that another LAA-capable eNB in the network may attempt a DRS transmission. The first eNB may then puncture one or more of the last OFDM symbols 640 of resource block 600 to enable LBT procedures of other eNBs to succeed and lead to successful DRS transmissions. For example, in some embodiments, an eNB may puncture the last three OFDM symbols 640 of resource block 600.

Figure 7:
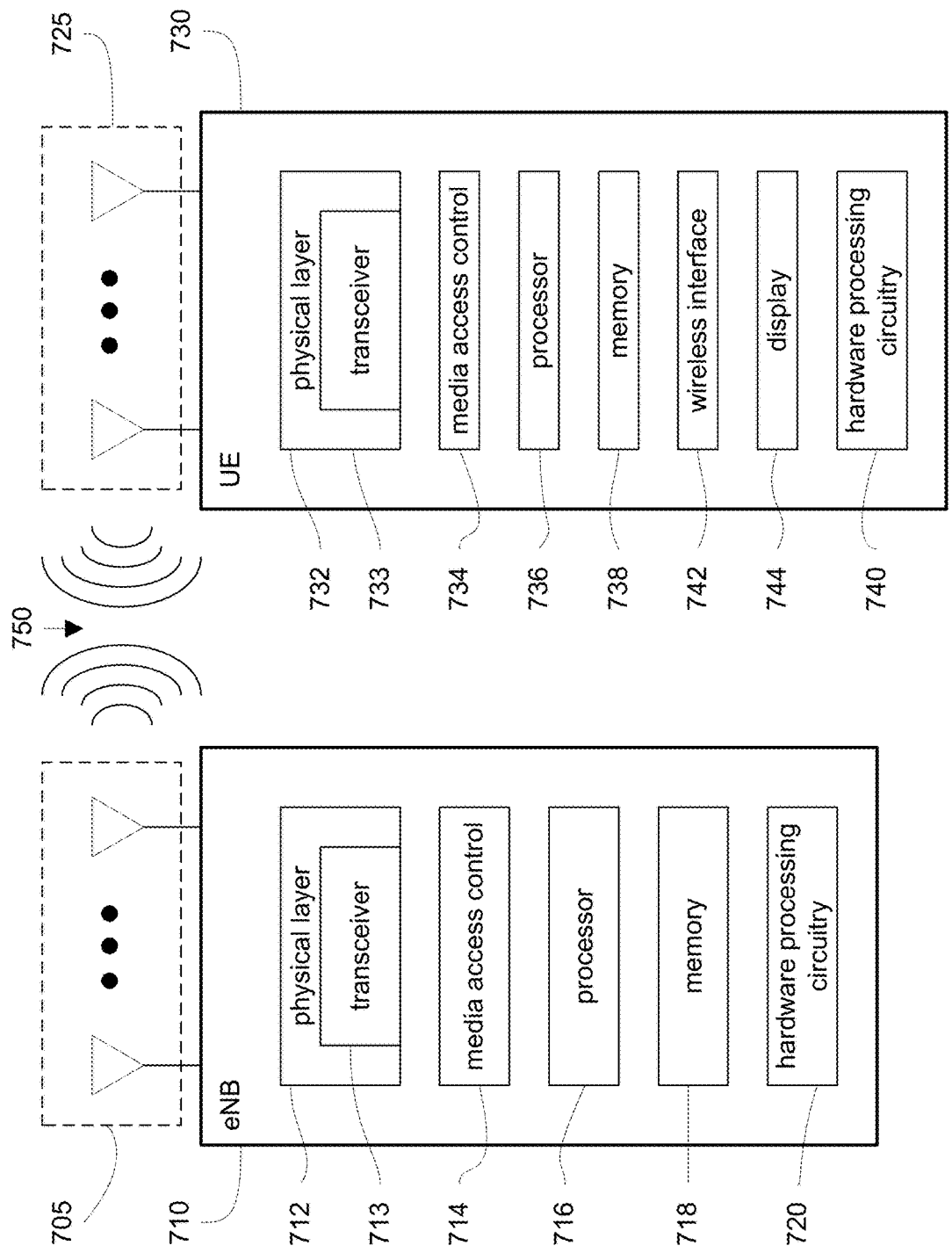
FIG. 7 illustrates an embodiment of an eNB and an embodiment of a User Equipment (UE).

FIG. 7 illustrates an embodiment of an eNB and an embodiment of a User Equipment (UE). More specifically, FIG. 7 includes block diagrams of an eNB 710 and a UE 730 which are operable to co-exist with each other and other elements of an LTE network. High-level, simplified architectures of eNB 710 and UE 730 are described so as not to obscure the embodiments. It should be noted that in some embodiments, eNB 710 may be a stationary non-mobile device.

eNB 710 is coupled to one or more antennas 705, and UE 730 is similarly coupled to one or more antennas 725. However, in some embodiments, eNB 710 may incorporate or comprise antennas 705, and UE 730 in various embodiments may incorporate or comprise antennas 725.

In some embodiments, antennas 705 and/or antennas 725 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 705 and/or antennas 725 are separated to take advantage of spatial diversity.

eNB 710 and UE 730 are operable to communicate with each other on a network, such as a wireless network. More specifically, eNB 710 and UE 730 may be in communication with each other over a wireless communication channel 750, which has both a downlink path from eNB 710 to UE 730 and an uplink path from UE 730 to eNB 710.

As illustrated in FIG. 7, in some embodiments, eNB 710 may include a physical layer circuitry 712, a MAC (media access control) circuitry 714, a processor 716, a memory 718, and a hardware processing circuitry 720. A person skilled in the art will appreciate that other components not shown may be used in addition to the components shown to form a complete eNB.

In some embodiments, physical layer circuitry 712 includes a transceiver 713 for providing signals to and from UE 730. Transceiver 713 provides signals to and from UEs or other devices using one or more antennas 705. In some embodiments, MAC circuitry 714 controls access to the wireless medium. Memory 718 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Hardware processing circuitry 720 may comprise logic devices or circuitry to perform various operations. In some embodiments, processor 716 and memory 718 are arranged to perform the operations of hardware processing circuitry 720, such as operations described herein with reference to logic devices and circuitry within eNB 710 and/or hardware processing circuitry 720.

As is also illustrated in FIG. 7, in some embodiments, UE 730 may include a physical layer circuitry 732, a MAC circuitry 734, a processor 736, a memory 738, a hardware processing circuitry 740, a wireless interface 742, and a display 744. A person skilled in the art would appreciate that other components not shown may be used in addition to the components shown to form a complete UE.

In some embodiments, physical layer circuitry 732 includes a transceiver 733 for providing signals to and from eNB 710 (as well as other eNBs). Transceiver 733 provides signals to and from eNBs or other devices using one or more antennas 725. In some embodiments, MAC circuitry 734 controls access to the wireless medium. In some embodiments, memory 738 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Wireless interface 742 may be arranged to allow the processor to communicate with another device. Display 744 may provide a visual and/or tactile display for a user to interact with UE 730, such as a touch-screen display. Hardware processing circuitry 740 may comprise logic devices or circuitry to perform various operations. In some embodiments, processor 736 and memory 738 may be arranged to perform the operations of hardware processing circuitry 740, such as operations described herein with reference to logic devices and circuitry within UE 730 and/or hardware processing circuitry 740.

Elements of FIG. 7, and elements of other figures having the same names or reference numbers, can operate or function in the manner described herein with respect to any such figures (although the operation and function of such elements is not limited to such descriptions). For example, FIGS. 8 and 11-12 also depict embodiments of hardware processing circuitry of eNBs, and the embodiments described with respect to FIG. 7 and FIGS. 8 and 11-12 can operate or function in the manner described herein with respect to any of the figures.

In addition, although eNB 710 and UE 730 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 8:
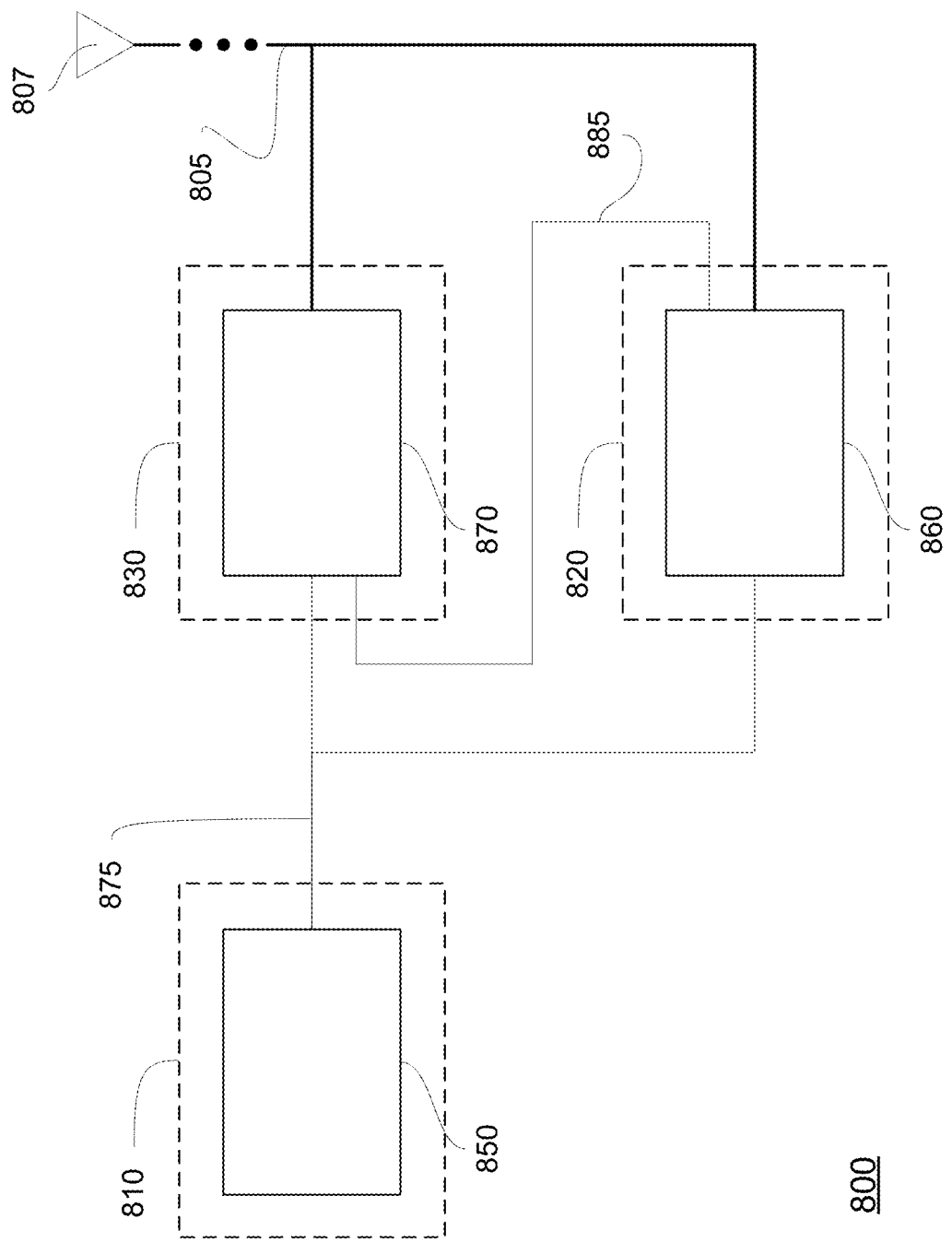
FIG. 8 illustrates embodiments of a hardware processing circuitry for an eNB.

FIG. 8 illustrates embodiments of a hardware processing circuitry for an eNB. eNB 710 (or another eNB) may include a hardware processing circuitry 800, which may comprise logic devices or circuitry to perform various operations. In some embodiments, processor 716 and memory 718 (and/or other elements or components of eNB 710) may be arranged to perform the operations of hardware processing circuitry 800, such as operations described herein with reference to devices and circuitry within hardware processing circuitry 800. For example, one or more devices or circuits of hardware processing circuitry 800 may be implemented by combinations of software-configured elements and/or other hardware elements.

In some embodiments, hardware processing circuitry 800 may comprise one or more antenna ports 805 operable to provide DRS transmissions over wireless communication channel 750 (or another wireless communication channel). Antenna ports 805 may be coupled to one or more antennas 807 (which may be antennas 705). In some embodiments, hardware processing circuitry 800 may incorporate antennas 807, while in other embodiments, hardware processing circuitry 800 may merely be coupled to antennas 807.

Antennas ports 805 and antennas 807 may be operable to provide signals from eNB 710 to channel 750, and may be operable to provide signals from channel 750 to eNB 710. For example, antenna ports 805 may be operable to provide transmissions to UE 730 (or another UE) over channel 750.

With reference to FIG. 8, in some embodiments, hardware processing circuitry 800 may comprise a first circuitry 810, a timing indicator 875, a second circuitry 820, an LBT check indicator 885, and a third circuitry 830. First circuitry 810 may be operable to determine a DMTC window of channel 750, which may be communicated to second circuitry 820 and third circuitry 830 through timing indicator 875. Second circuitry 820 may be operable to initiate a set of one or more CCA checks through antennas 807 coupled to antenna ports 805, prior to the start of a DRS occasion within the DMTC window, and may communicate the status of the CCA checks to third circuitry 830 through LBT check indicator 885. Third circuitry 830 may be operable to initiate a DRS transmission through antennas 807 within the DMTC window when any CCA check of the set of one or more CCA checks senses that channel 750 is idle.

In some embodiments, at least one of the CCA checks includes a sensing of channel 750 for a specified duration. In such embodiments, one of the CCA checks may sense that channel 750 is idle when an energy received by antennas 807 is less than a predetermined ED threshold for the CCA check. In some embodiments, the predetermined ED threshold may be set to a value substantially the same as an ED threshold used for CCA checks for DL data burst transmissions. In some embodiments, the predetermined ED threshold may be set to a value less than the ED threshold used for CCA checks for DL data burst transmissions. In various embodiments, the predetermined ED threshold may be set to a value between approximately −62 dBm and approximately −67 dBm.

In some embodiments, at least one of the CCA checks begins sensing the channel 750 at a time C+R before the start of the DRS occasion, where C is a minimum sensing period for the channel 750 and R is a reservation signal transmission time. In such embodiments, third circuitry 830 may be operable to initiate a reservation signal transmission through antennas 807 at a time R before the start of the DRS occasion. In some embodiments, at least one of the CCA checks begins sensing channel 750 at the time C prior to the start of the DRS occasion. In other embodiments, at least one of the CCA checks begins sensing the channel 750 at a time N before the start of the DRS occasion, wherein N is a random duration uniformly generated between 0 ms and 1 ms. In such embodiments, third circuitry 830 may be operable to initiate a reservation signal before the DRS transmission and after the completion of the sensing for the time N.

In some embodiments, the DRS transmission may be initiated in a predetermined sub-frame within the DMTC window. In other embodiments, the set of one or more CCA checks may include a plurality of CCA checks, and the DRS transmission may be initiated on any of a plurality of consecutive sub-frames within the DMTC window. In still further embodiments, the set of one or more CCA checks may include a plurality of CCA checks, and the DRS transmission may be initiated on any of a plurality of periodically-spaced sub-frames within the DMTC window.

In some embodiments, the DRS transmission is initiated within a DL burst. For example, first circuitry 810 may be operable to determine a DL burst window, and third circuitry 830 may be operable to initiate a DRS transmission through the antenna within the DL burst window.

With reference again to FIG. 8, in some embodiments, hardware processing circuitry 800 may comprise a timer 850, a timing indicator 875, a sensing circuit 860, an LBT check indicator 885, and a signaling circuitry 870. Timer 850 may be operable to determine a DMTC window of channel 750, and may also be operable to determine a LBT starting time prior to the start of a DRS occasion within the DMTC window. Timer 850 may communicate the DMTC window and LBT starting time to sensing circuit 860 and signaling circuitry 870 through timing indicator 715. Sensing circuit 860 may be operable to initiate a set of one or more CCA checks of channel 750 at the LBT starting time, and may communicate the status of the CCA checks to signaling circuitry 870 through LBT check indicator 885. Signaling circuitry 870 may be operable to initiate—within the DMTC window, and upon a CCA check sensing that channel 750 is idle—a DRS transmission through antennas 807 and over channel 750.

In some embodiments, at least one of the CCA checks may begin sensing channel 750 at a time R+C before the start of the DRS occasion, where C is a minimum sensing period for the wireless communications channel, and R is a reservation signal transmission time. In such embodiments, signaling circuitry 870 may be operable to initiate a reservation signal transmission through antennas 807 at a time R before the start of the DMTC window. In some embodiments, at least one of the CCA checks may begin sensing channel 750 at a time C prior to the start of the DRS occasion, where C is a minimum sensing period for the channel 750. In other embodiments, at least one of the CCA checks may begin sensing the channel 750 at a time N before the start of the DRS occasion, where N is a random duration uniformly generated between 0 ms and 1 ms. In such embodiments, signaling circuitry 870 may be operable to initiate a reservation signal before the DRS transmission and after the completion of the sensing for the time N.

In some embodiments, the DRS transmission may be initiated in a predetermined, or fixed sub-frame within the DMTC window. In other embodiments, the set of one or more CCA checks may include a plurality of CCA checks, and the DRS transmission may be initiated on any of a plurality of consecutive sub-frames within the DMTC window. In still further embodiments, the set of one or more CCA checks may include a plurality of CCA checks, and the DRS transmission may be initiated on any of a plurality of periodically spaced sub-frames within the DMTC window.

In some embodiments, timer 850 may also be operable to determine a DL burst window, and signaling circuitry 870 may be operable to initiate a DRS transmission within the DL burst window through antennas 807.

Figure 9:
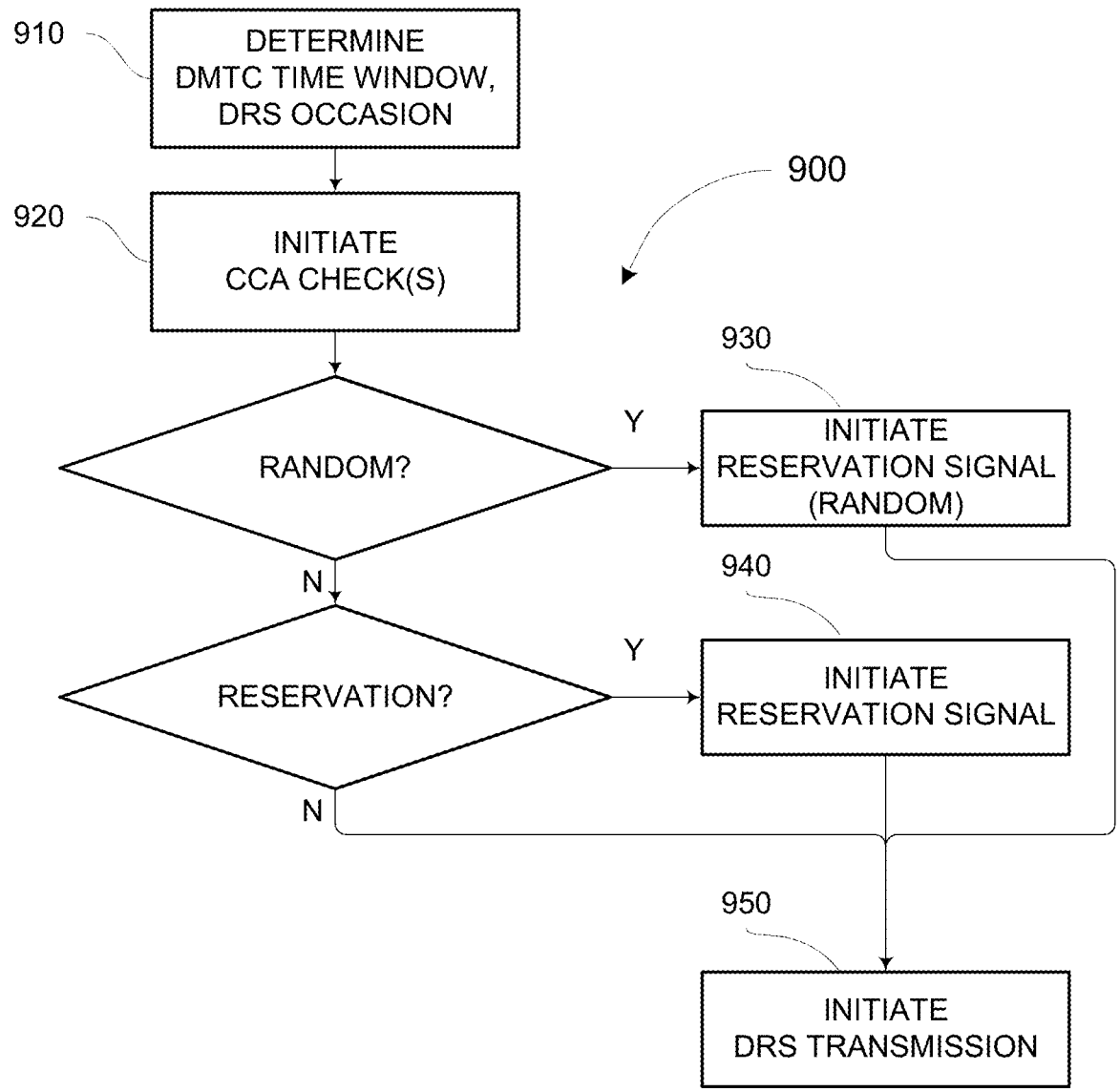
FIGS. 9-10 illustrate embodiments of methods for transmitting DRS subject to LBT.
Figure 10:
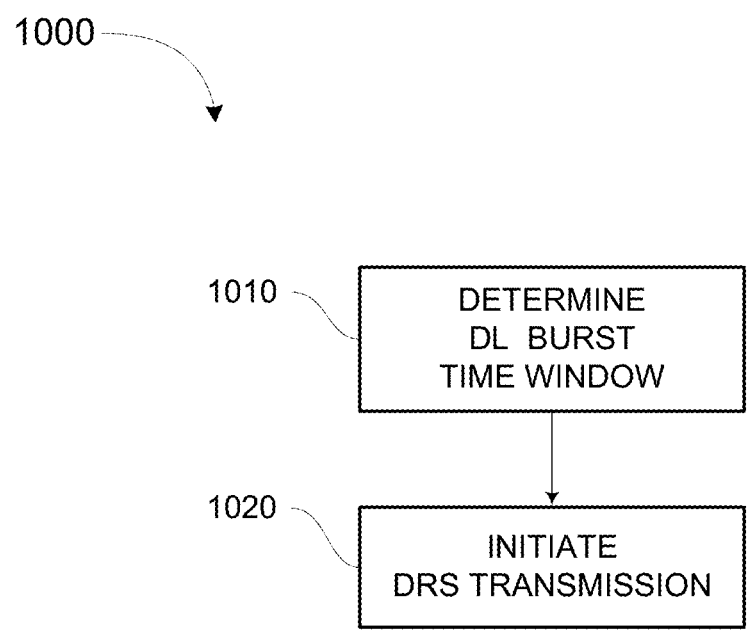

FIGS. 9-10 illustrate embodiments of methods for transmitting DRS subject to LBT. With reference to FIG. 9, a method 900 may include a determination 910 of a DMTC time window and a DRS occasion, an initiation 920 of one or more CCA checks, an initiation 930 of a reservation signal at a random time N before the DRS occasion, an initiation 940 of a reservation signal at a time R+C before the DRS occasion, and an initiation 950 of a DRS transmission.

More particularly, in determination 910, a DMTC window for wireless communication channel 750 (or another wireless communication channel), and a DRS occasion within the DMTC window, may be determined for eNB 750 (or another eNB). In initiation 920, a set of one or more CCA checks of channel 750 may be initiated. In initiation 950, a DRS transmission over channel 750 may be initiated within the DMTC window, when any CCA check of the set of one or more CCA checks sensing channel 750 is idle. In some embodiments, at least one of the CCA checks may begin sensing channel 750 at a time C prior to the start of the DMTC window, where C is a minimum sensing period for channel 750.

For embodiments supporting reservation signals at a time N before the DRS occasion, in initiation 930, a reservation signal over channel 750 may be initiated before the DRS transmission. In such embodiments, at least one of the CCA checks may begin sensing channel 750 at a time N before the start of the DMTC window, where N is a random duration uniformly generated between 0 ms and 1 ms.

For embodiments supporting reservation signals at a time R+C before the DRS occasion, in initiation 940, a reservation signal over channel 750 may be initiated at a time R before the start of the DMTC window. In such embodiments, at least one of the CCA checks may begin sensing channel 750 at a time R+C before the start of the DMTC window, where C is a minimum sensing period for channel 750.

In some embodiments, the DRS channel transmission may be initiated in a predetermined, or fixed sub-frame within the DMTC window. In some embodiments, the set of one or more CCA checks may include a plurality of CCA checks, and the DRS transmission may be initiated on any of a plurality of continuous sub-frames within the DMTC window. In some embodiments, the set of one or more CCA checks may include a plurality of CCA checks, and the DRS transmission may be initiated on any of a plurality of spaced sub-frames within the DMTC window.

With reference to FIG. 10, a method 1000 may include a determination 1010 of a DL burst time window, and an initiation 1020 of a DRS transmission. More particularly, in initiation 1020, a DRS transmission may be initiated through antenna 807 coupled to antenna port 805 of eNB 710 within the DL burst time window determined in determination 1010.

Although the actions in the flowcharts with reference to FIGS. 9-10 are shown in a particular order, the order of the actions may be modified. Thus, unless otherwise indicated, the illustrated actions can be performed in a different order, and some actions may be performed in parallel. Some of the listed actions may be optional in accordance with certain embodiments. The numbering of the illustrated actions is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 710 (or another eNB) to perform an operation comprising method 900 and/or an operation comprising method 1000. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 11:
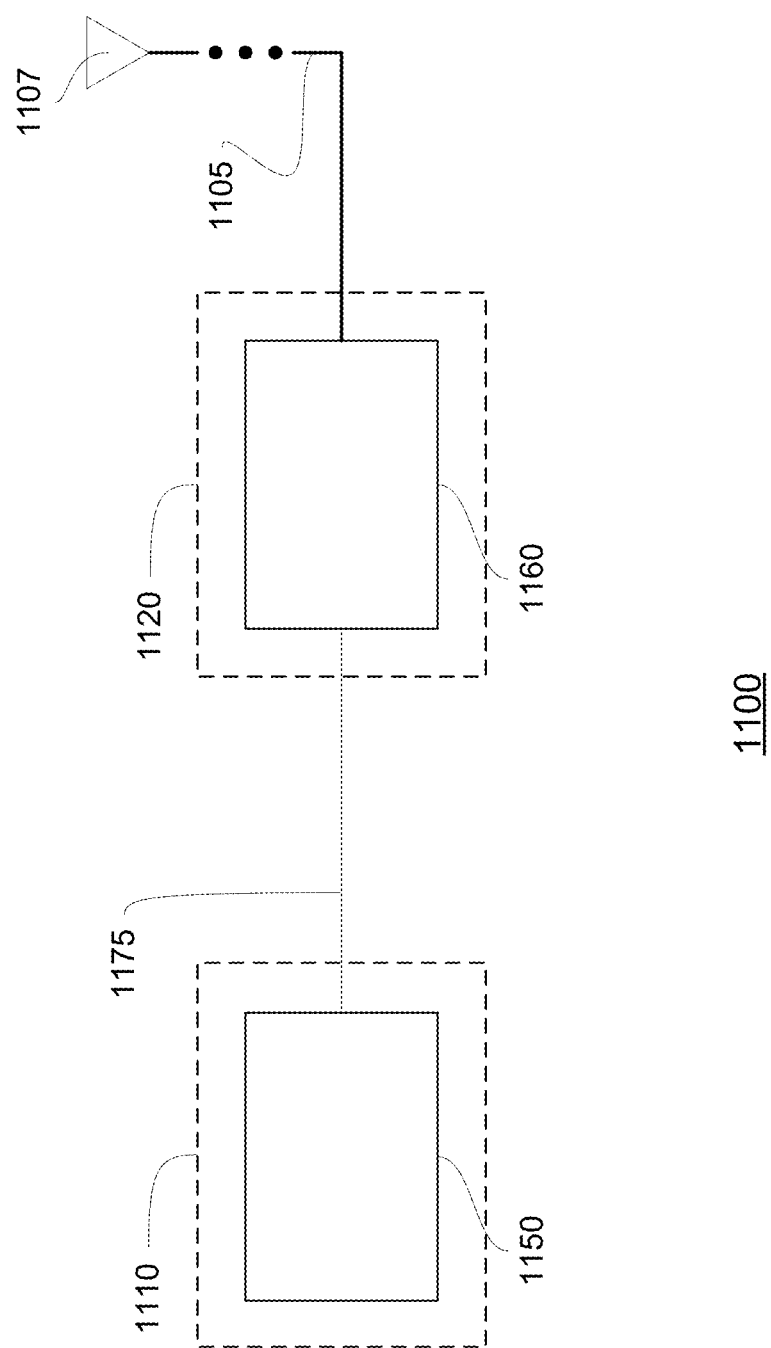
FIG. 11 illustrates embodiments of a hardware processing circuitry for an eNB.

FIG. 11 illustrates embodiments of a hardware processing circuitry for an eNB. eNB 710 (or another eNB) may include a hardware processing circuitry 1100, which may comprise logic devices or circuitry to perform various operations. In some embodiments, processor 716 and memory 718 (and/or other elements or components of eNB 710) may be arranged to perform the operations of hardware processing circuitry 1100, such as operations described herein with reference to devices and circuitry within hardware processing circuitry 1100. For example, one or more devices or circuits of hardware processing circuitry 1100 may be implemented by combinations of software-configured elements and/or other hardware elements.

In some embodiments, hardware processing circuitry 1100 may comprise one or more antenna ports 1105 operable to provide DRS transmissions over wireless communication channel 750 (or another wireless communication channel). Antenna ports 1105 may be coupled to one or more antennas 1107 (which may be antennas 705). Antennas 1107 may be operable to provide signals from eNB 710 to channel 750, and may be operable to provide signals from channel 750 to eNB 710. For example, antenna ports 1105 may be operable to provide DRS transmissions or other transmissions to UE 730 (or another UE) over channel 750. In some embodiments, circuitry 1100 may incorporate antennas 1107, while in other embodiments, circuitry 1100 may merely be coupled to antennas 1107.

With reference to FIG. 11, in some embodiments, hardware processing circuitry 1100 may comprise a first circuitry 1110, a timing indicator 1175, and a second circuitry 1120. First circuitry 1110 may be operable to determine a DMTC window of channel 750, which may be communicated to second circuitry 1120 through timing indicator 1175. Second circuitry 1120 may be operable to initiate a DRS transmission through antennas 1107 coupled to antenna ports 1105 upon the DMTC start time.

In some embodiments, the DMTC start time may be equal to I*mod(ID,N), where I may be a length of a DRS search interval, ID may be a number identifying eNB 710, and N may be a number of DMTC start time locations within the DMTC window. In some such embodiments, ID may be a PCID of eNB 710. In further such embodiments, N may be equal to P/I, where P is a length of the DMTC window.

With reference again to FIG. 11, in some embodiments, hardware processing circuitry may comprise a timer 1150, a timing indicator 1175, and a signaling circuitry 1160. Timer 1150 may be operable to determine a DMTC window of channel 750 and a DMTC start time within the DMTC window. Signaling circuitry 1160 may be operable to initiate a DRS transmission over channel 750, upon the DMTC start time.

In some embodiments, the DMTC start time may be equal to I*mod(ID,N), where I may be a length of a DRS search interval, ID may be a number identifying eNB 710, and N may be a number of DMTC start time locations within the DMTC window. In some such embodiments, ID may be a PCID of eNB 710. In further such embodiments, N may be equal to P/I, where P is a length of the DMTC window.

Figure 12:
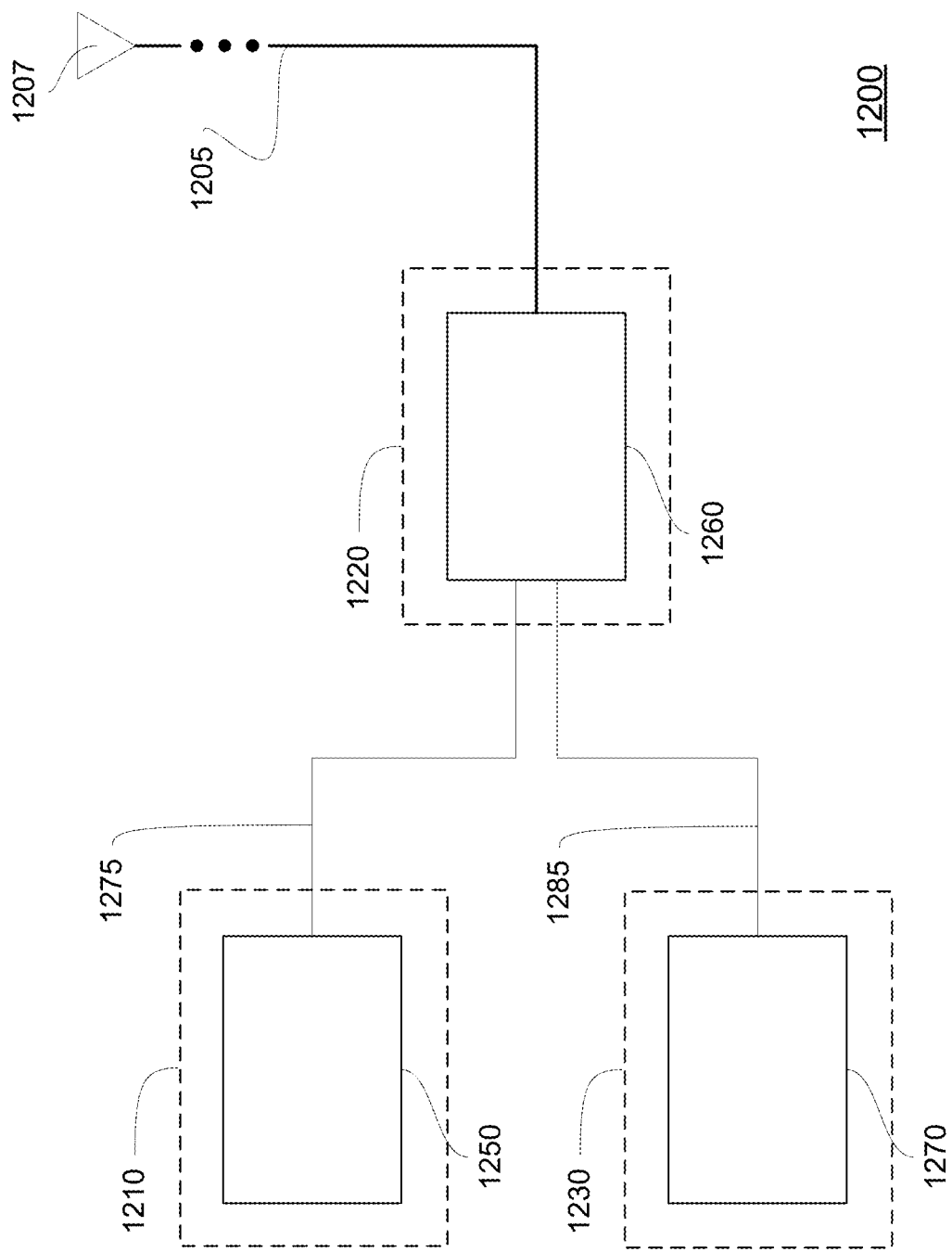
FIG. 12 illustrates embodiments of a hardware processing circuitry for an eNB.

FIG. 12 illustrates embodiments of a hardware processing circuitry for an eNB. eNB 710 (or another eNB) may include a hardware processing circuitry 1200, which may comprise logic devices or circuitry to perform various operations. In some embodiments, processor 716 and memory 718 (and/or other elements or components of eNB 710) may be arranged to perform the operations of hardware processing circuitry 1200, such as operations described herein with reference to devices and circuitry within hardware processing circuitry 1200. For example, one or more devices or circuits of hardware processing circuitry 1200 may be implemented by combinations of software-configured elements and/or other hardware elements.

In some embodiments, hardware processing circuitry 1200 may comprise one or more antenna ports 1205 operable to provide DRS transmissions over wireless communication channel 750 (or another wireless communication channel). Antenna ports 1205 may be coupled to one or more antennas 1207 (which may be antennas 705). Antennas 1207 may be operable to provide signals from eNB 710 to channel 750, and may be operable to provide signals from channel 750 to eNB 710. For example, antenna ports 1205 may be operable to provide DRS transmissions or other transmissions to UE 730 (or another UE) over channel 750. In some embodiments, circuitry 1200 may incorporate antennas 1207, while in other embodiments, circuitry 1200 may merely be coupled to antennas 1207.

With reference to FIG. 12, in some embodiments, hardware processing circuitry 1200 may comprise a first circuitry 1210, a timing indicator 1275, a second circuitry 1220, a third circuitry 1230, and a PDSCH puncture indicator 1185. First circuitry 1210 may be operable to determine a DRS transmission time, which may be communicated to second circuitry 1220 through timing indicator 1275. Second circuitry 1220 may be operable to initiate a PDSCH transmission through antennas 1207 coupled to antenna ports 1205. Third circuitry 1230 may be operable to puncture one or more of the final OFDM symbols of the PDSCH transmission, by asserting a PDSCH puncture indicator 1285 to second circuitry 1220.

In some embodiments, the DRS transmission time may be in a DMTC window. In some such embodiments, the DRS transmission time may be at the start of the DMTC window. In some embodiments, third circuitry 1230 may be operable to puncture the last three symbols of the PDSCH transmission.

With reference again to FIG. 12, in some embodiments, hardware processing circuitry 1200 may comprise a timer 1250, a timing indicator 1275, a transmission circuitry 1260, a puncturing circuitry 1270, and a PDSCH puncture indicator 1285. Timer 1250 may be operable to determine a DRS transmission time, which may be communicated to transmission circuitry 1260 through timing indicator 1275. Transmission circuitry 1260 may be operable to initiate a PDSCH transmission over channel 750 at the DRS transmission time. Puncturing circuitry 1270 may be operable to puncture one or more of the final OFDM symbols of the PDSCH transmission, by asserting a PDSCH puncture indicator 1285 to transmission circuitry 1260.

In some embodiments, the DRS transmission time may be in a DMTC window. In some such embodiments, the DRS transmission time may be at the start of the DMTC window. In some embodiments, puncturing circuitry 1270 may puncture the last three OFDM symbols of the PDSCH transmission.

Figure 13:
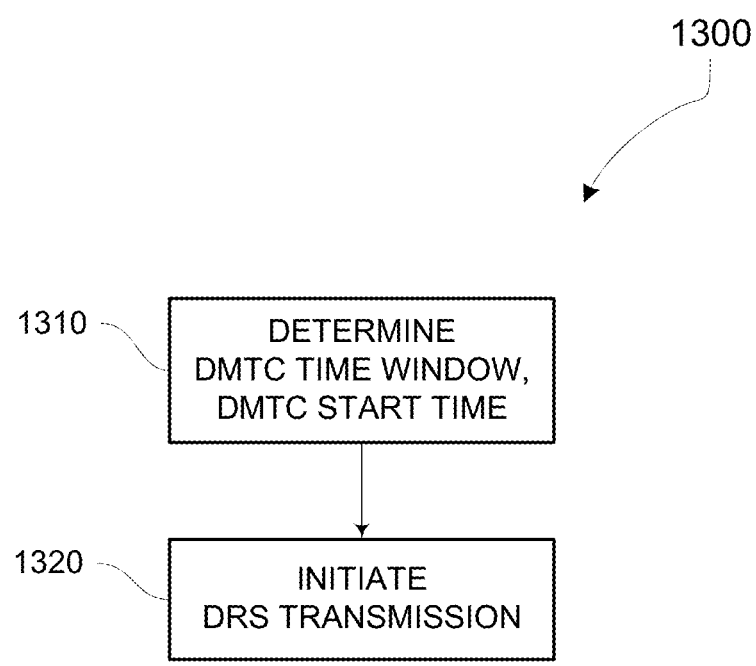
FIGS. 13-14 illustrate embodiments of methods for an eNB to proactively support DRS in LAA.
Figure 14:
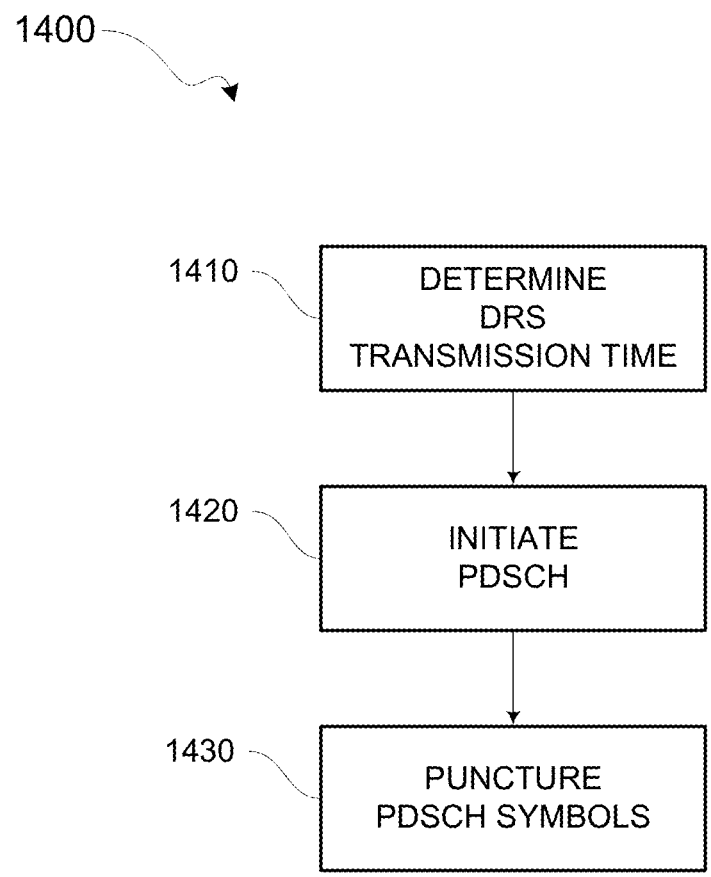

FIGS. 13-14 illustrate embodiments of methods for an eNB to proactively support DRS in LAA. With reference to FIG. 13, a method 1300 may include a determination 1310 of a DMTC time window and a DMTC start time, and an initiation 1320 of a DRS transmission. More particularly, in determination 1310, a DMTC window for channel 750 (or another wireless communication channel), and a DMTC start time within the DMTC window, may be determined for eNB 710 (or another eNB). In initiation 1320, a DRS transmission may be initiated through antennas 1107 coupled to antenna ports 1105 of eNB 710 upon the DMTC start time within the DMTC window.

In some embodiments, the DMTC start time may be equal to I*mod(ID,N), where may be is a length of a DRS search interval, ID may be a number identifying eNB 710, and N may be a number of DMTC start time locations within the DMTC window. In some such embodiments, ID may be a PCID of eNB 710. In some embodiments, N may be equal to P/I, where P is a length of the DMTC window.

With reference to FIG. 14, a method 1400 may include a determination 1410 of a DRS transmission time, an initiation 1420 of a DRS transmission, and a puncture 1430 of PDSCH symbols. More particularly, in determination 1410, a DRS transmission time may be determined for eNB 710 (or another eNB). In initiation 1420, a PDSCH transmission may be initiated over wireless communication channel 750 (or another wireless communication channel). In puncture 1430, one or more of the final OFDM symbols of the PDSCH transmission may be punctured.

In some embodiments, the DRS transmission time may be in a DMTC window. In some such embodiments, the DRS transmission time may be at the start of the DMTC window. In some embodiments, the last three OFDM symbols of the PDSCH transmission are punctured.

Although the actions in the flowcharts with reference to FIGS. 13-14 are shown in a particular order, the order of the actions can be modified. Thus, unless otherwise indicated, the illustrated actions can be performed in a different order, and some actions may be performed in parallel. Some of the listed actions may be optional in accordance with certain embodiments. The numbering of the illustrated actions is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 710 (or another eNB) to perform an operation comprising method 1300 and/or an operation comprising method 1400. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 15:
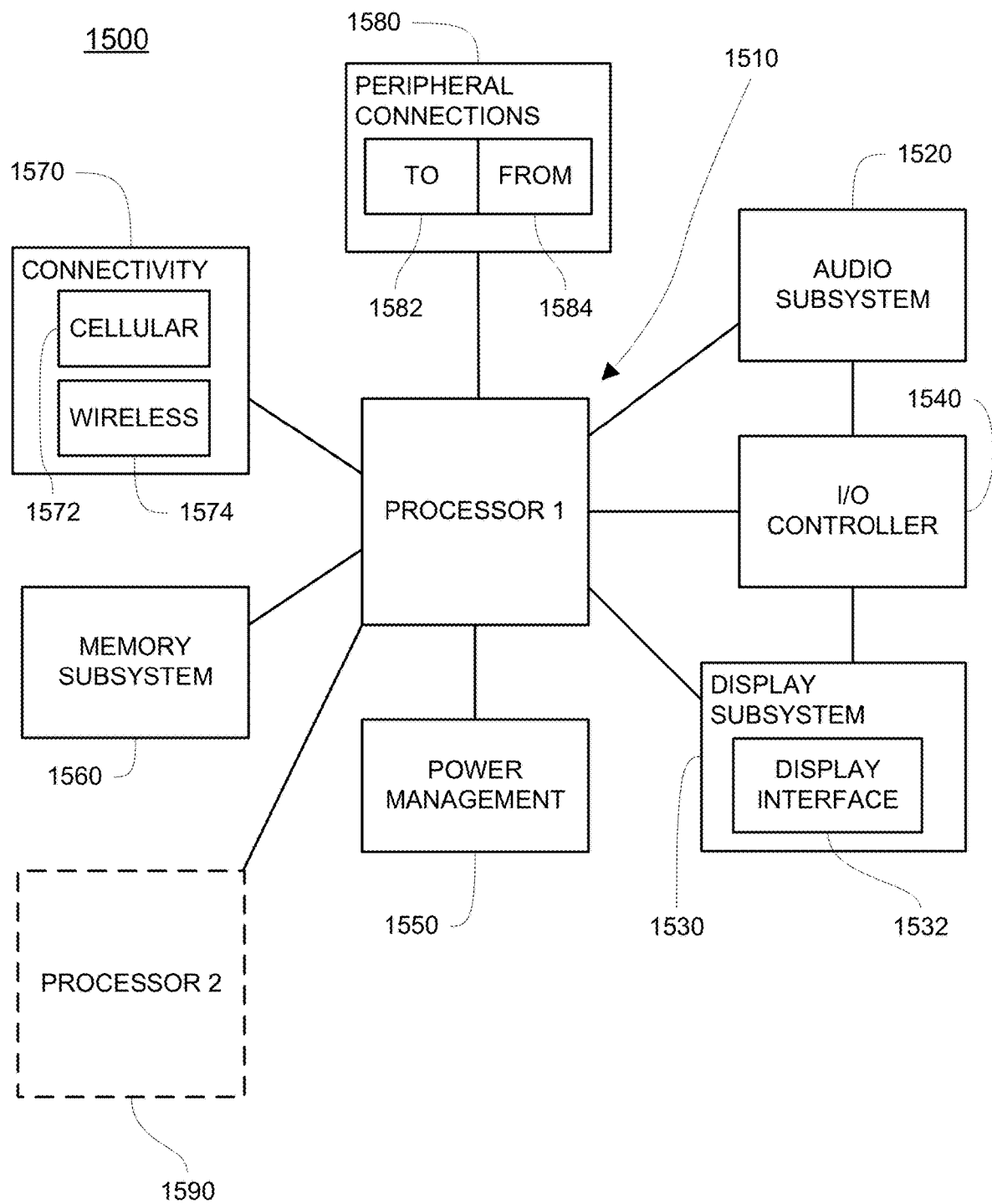
FIG. 15 illustrates a computing device with mechanisms for eNB support of DRS in accordance with LAA specifications, according to some embodiments of the disclosure.

FIG. 15 illustrates a computing device with mechanisms for eNB support of DRS in accordance with LAA specifications, according to some embodiments of the disclosure. It is pointed out that those elements of FIG. 15 having the same reference numbers (or names) as the elements of any other figure can operate or function in any manner similar to that described, but are not limited to such.

Computing device 1500 may be an electronic device, a computer system, an SoC, a tablet, a smart phone, or a smart device with mechanisms for eNB support of DRS in accordance with LAA specifications, according to some embodiments of the disclosure. FIG. 15 illustrates a block diagram of an embodiment of a mobile device which may be operable to use flat surface interface connectors. In one embodiment, computing device 1500 may be a mobile computing device, such as a computing tablet, a mobile phone or smart-phone, a wireless-enabled e-reader, or other wireless mobile device. It will be understood that certain components are shown generally, and not all components of such a device are shown in computing device 1500.

Computing device 1500 includes a first processor 1510 with mechanisms for eNB support of DRS in accordance with LAA specifications, according to some embodiments discussed. Other blocks of computing device 1500 may also include the mechanisms for eNB support of DRS in accordance with LAA specifications of some embodiments. The various embodiments of the present disclosure may also comprise a network interface within 1570 such as a wireless interface so that a system embodiment may be incorporated into a wireless device, for example a cell phone or personal digital assistant.

In some embodiments, processor 1510 can include one or more physical devices, such as microprocessors, application processors, microcontrollers, programmable logic devices, or other processing means. The processing operations performed by processor 1510 may include the execution of an operating platform or operating system on which applications and/or device functions may then be executed. The processing operations may also include operations related to one or more of the following: I/O (input/output) with a human user or with other devices; power management; connecting computing device 1500 to another device; audio I/O; and/or display I/O.

In some embodiments, computing device 1500 includes an audio subsystem 1520, which represents hardware components (e.g., audio hardware and audio circuits) and software components (e.g., drivers and/or codecs) associated with providing audio functions to computing device 1500. Audio functions can include speaker and/or headphone output as well as microphone input. Devices for such functions can be integrated into computing device 1500, or connected to computing device 1500. In one embodiment, a user interacts with computing device 1500 by providing audio commands that are received and processed by processor 1510.

In some embodiments, computing device 1500 includes a display subsystem 1530, which represents hardware components (e.g., display devices) and software components (e.g., drivers) that provide a visual and/or tactile display for a user to interact with computing device 1500. Display subsystem 1530 may include a display interface 1532, which may be a particular screen or hardware device used to provide a display to a user. In one embodiment, display interface 1532 includes logic separate from processor 1510 to perform at least some processing related to the display. In some embodiments, display subsystem 1530 includes a touch screen (or touch pad) device that provides both output and input to a user.

In some embodiments, computing device 1500 includes an I/O controller 1540 associated with hardware devices and software components related to interaction with a user. I/O controller 1540 is operable to manage hardware that is part of audio subsystem 1520 and/or display subsystem 1530. Additionally, I/O controller 1540 may be a connection point for additional devices that connect to computing device 1500, through which a user might interact with the system. For example, devices that can be attached to computing device 1500 might include microphone devices, speaker or stereo systems, video systems or other display devices, keyboard or keypad devices, or other I/O devices for use with specific applications such as card readers or other devices.

As mentioned above, I/O controller 1540 can interact with audio subsystem 1520 and/or display subsystem 1530. For example, input through a microphone or other audio device can provide input or commands for one or more applications or functions of computing device 1500. Additionally, audio output can be provided instead of, or in addition to, display output. In another example, if display subsystem 1530 includes a touch screen, the display device may also act as an input device, which can be at least partially managed by I/O controller 1540. There can also be additional buttons or switches on computing device 1500 to provide I/O functions managed by I/O controller 1540.

In some embodiments, I/O controller 1540 manages devices such as accelerometers, cameras, light sensors or other environmental sensors, or other hardware that can be included in computing device 1500. The input can be part of direct user interaction, and may provide environmental input to the system to influence its operations (such as filtering for noise, adjusting displays for brightness detection, applying a flash for a camera, or other features).

In some embodiments, computing device 1500 includes a power management component 1550 that manages battery power usage, charging of the battery, and features related to power saving operation.

A memory subsystem 1560 includes memory devices for storing information in computing device 1500. Memory subsystem 1560 can include nonvolatile memory devices (whose state does not change if power to the memory device is interrupted) and/or volatile memory devices (whose state is indeterminate if power to the memory device is interrupted). Memory subsystem 1560 can store application data, user data, music, photos, documents, or other data, as well as system data (whether long-term or temporary) related to the execution of the applications and functions of computing device 1500.

Some portion of memory subsystem 1560 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1500 includes a network interface within a connectivity component 1570, such as a cellular interface 1572 or a wireless interface 1574, so that an embodiment of computing device 1500 may be incorporated into a wireless device such as a cellular phone or a personal digital assistant. In some embodiments, connectivity component 1570 includes hardware devices (e.g., wireless and/or wired connectors and communication hardware) and software components (e.g., drivers and/or protocol stacks) to enable computing device 1500 to communicate with external devices. Computing device 1500 could include separate devices, such as other computing devices, wireless access points or base stations, as well as peripherals such as headsets, printers, or other devices.

In some embodiments, connectivity component 1570 can include multiple different types of network interfaces, such as one or more wireless interfaces for allowing processor 1510 to communicate with another device. To generalize, computing device 1500 is illustrated with cellular interface 1572 and wireless interface 1574. Cellular interface 1572 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 1574 refers generally to non-cellular wireless interfaces, and can include personal area networks (such as Bluetooth, Near Field, etc.), local area networks (such as Wi-Fi), and/or wide area networks (such as WiMax), or other wireless communication.

In some embodiments, computing device 1500 has various peripheral connections 1580, which may include hardware interfaces and connectors, as well as software components (e.g., drivers and/or protocol stacks) to make peripheral connections. It will be understood that computing device 1500 could both be a peripheral device to other computing devices (via "to" 1582), as well as have peripheral devices connected to it (via "from" 1584). The computing device 1500 may have a "docking" connector to connect to other computing devices for purposes such as managing content on computing device 1500 (e.g., downloading and/or uploading, changing, synchronizing). Additionally, a docking connector can allow computing device 1500 to connect to certain peripherals that allow computing device 1500 to control content output, for example, to audiovisual or other systems.

In addition to a proprietary docking connector or other proprietary connection hardware, computing device 1500 can make peripheral connections 1580 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an Evolved Node-B (eNB) operable to communicate with a User Equipment (UE) on a network. The eNB includes hardware processing circuitry that may comprise an antenna port, a first circuitry, a second circuitry, and a third circuitry. The antenna port may be operable to provide Discovery Reference Signal (DRS) transmissions over a wireless communication channel, and may be operable to provide Clear Channel Assessment (CCA) checks of the wireless communication channel. The first circuitry may be operable to determine a Discovery Measurement Timing Configuration (DMTC) window of the wireless communications channel. The second circuitry may be operable to initiate, prior to the start of a DRS occasion within the DMTC window, a set of one or more CCA checks through an antenna coupled to the antenna port. The third circuitry may be operable to initiate a DRS transmission through the antenna within the DMTC window upon any CCA check of the set of one or more CCA checks sensing that the wireless communication channel is idle.

In example 2, the eNB of example 1 is provided, wherein at least one of the CCA checks may include sensing the channel for a specified duration, and wherein an idle condition may be sensed by one of the CCA checks when an energy received is less than a predetermined energy detection (ED) threshold for the CCA check.

In example 3, the eNB of example 2 is provided, wherein the predetermined ED threshold may be set to a value substantially the same as an ED threshold used for CCA checks for downlink (DL) data burst transmissions.

In example 4, the eNB of example 2, wherein the predetermined ED threshold may be set to a value less than an ED threshold used for CCA checks for downlink (DL) data burst transmissions.

In example 5, the eNB of any of examples 2 through 4 is provided, wherein the predetermined ED threshold may be set to a value between approximately −62 dBm and approximately −67 dBm.

In example 6, the eNB of any of examples 1 through 5 is provided, wherein at least one of the CCA checks may begin sensing the wireless communications channel at a time C+R before the start of the DRS occasion, wherein C is a minimum sensing period for the wireless communications channel, wherein R is a reservation signal transmission time, and wherein the third circuitry is operable to initiate a reservation signal transmission through the antenna at a time R before the start of the DRS occasion.

In example 7, the eNB of any of examples 1 through 6 is provided, wherein at least one of the CCA checks may begin sensing the wireless communications channel at a time C prior to the start of the DRS occasion, wherein C is a minimum sensing period for the wireless communications channel.

In example 8, the eNB of any of examples 1 through 6 is provided, wherein at least one of the CCA checks may begin sensing the wireless communications channel at a time N before the start of the DRS occasion, wherein N is a random duration uniformly generated between 0 ms and 1 ms, and wherein the third circuitry is operable to initiate a reservation signal before the DRS transmission and after the completion of the sensing for the time N.

In example 9, the eNB of any of examples 1 through 8 is provided, wherein the DRS transmission may be initiated in a predetermined sub-frame within the DMTC window.

In example 10, the eNB of any of examples 1 through 9 is provided, wherein the set of one or more CCA checks may include a plurality of CCA checks, and the DRS transmission may be initiated on any of a plurality of consecutive sub-frames within the DMTC window.

In example 11, the eNB of any of examples 1 through 9 is provided, wherein the set of one or more CCA checks may include a plurality of CCA checks, and the DRS transmission may be initiated on any of a plurality of periodically spaced sub-frames within the DMTC window.

In example 12, the eNB of any of examples 1 through 11 is provided, wherein the DRS transmission may be initiated within a downlink (DL) burst.

In example 13, the eNB of any of examples 1 through 12 is provided, wherein the first circuitry may be operable to determine a downlink (DL) burst window, and wherein the third circuitry may be operable to initiate a DRS transmission through the antenna within the DL burst window.

Example 14 provides a system that may comprise a memory, a processor coupled to the memory, and an interface for allowing the processor to communicate with another device, the processor including the eNB of any of examples 1 through 13.

Example 15 provides an Evolved Node-B (eNB) configured to communicate with a User Equipment (UE) on a network, the eNB comprising an antenna port, a timer, a sensing circuit, and a signaling circuitry. The antenna port may be operable to provide transmissions to the UE over a wireless communication channel. The timer may be operable to determine a Discovery Measurement Timing Configuration (DMTC) window of the wireless communications channel, and operable to determine a Listen-Before-Talk (LBT) starting time prior to the start of a DRS occasion with the DMTC window. The sensing circuit may be operable to initiate, at the LBT starting time, a set of one or more Clear Channel Assessment (CCA) checks of the wireless communications channel. The signaling circuitry may be operable to initiate, within the DMTC window, and upon any CCA check of the set of one or more CCA checks sensing that the wireless communication channel is idle, a Discovery Reference Signal (DRS) transmission over the wireless communications channel.

In example 16, the eNB of example 15 is provided, wherein at least one of the CCA checks may begin sensing the wireless communications channel at a time R+C before the start of the DRS occasion, wherein C is a minimum sensing period for the wireless communications channel, wherein R is a reservation signal transmission time, and wherein the signaling circuitry may be operable to initiate a reservation signal transmission through an antenna coupled to the antenna port at a time R before the start of the DMTC window.

In example 17, the eNB of example 15 is provided, wherein at least one of the CCA checks may begin sensing the wireless communications channel at a time C prior to the start of the DRS occasion, wherein C is a minimum sensing period for the wireless communications channel.

In example 18, the eNB of example 15 is provided, wherein at least one of the CCA checks may begin sensing the wireless communications channel at a time N before the start of the DRS occasion, wherein N is a random duration uniformly generated between 0 ms and 1 ms, and wherein the signaling circuitry is operable to initiate a reservation signal before the DRS transmission and after the completion of the sensing for the time N.

In example 19, the eNB of any of examples 15 through 18 is provided, wherein the DRS transmission may be initiated in a predetermined sub-frame within the DMTC window.

In example 20, the eNB of any of examples 15 through 18 is provided, wherein the set of one or more CCA checks may include a plurality of CCA checks, and the DRS transmission may be initiated on any of a plurality of consecutive sub-frames within the DMTC window.

In example 21, the eNB of any of examples 15 through 18 is provided, wherein the set of one or more CCA checks may include a plurality of CCA checks, and the DRS transmission may be initiated on any of a plurality of periodically spaced sub-frames within the DMTC window.

In example 22, the eNB of any of examples 15 through 18 is provided, wherein the timer may be operable to determine a downlink (DL) burst window, and wherein the signaling circuitry may be operable to initiate a DRS transmission through an antenna coupled to the antenna port within the DL burst window.

Example 23 provides a system that may comprise a memory, a processor coupled to the memory, and an interface for allowing the processor to communicate with another device, the processor including the eNB of any of examples 15 through 22.

Example 24 provides a method performed by an Evolved Node-B (eNB) to communicate with a User Equipment (UE) on a network, that may comprise: determining, for an Evolved Node-B (eNB), a Discovery Measurement Timing Configuration (DMTC) window for a wireless communications channel and a DRS occasion within the DMTC window; initiating a set of one or more Clear Channel Assessment (CCA) checks of the wireless communications channel; and initiating, within the DMTC window, and upon any CCA check of the set of one or more CCA checks sensing that the wireless communication channel is idle, a Discovery Reference Signal (DRS) transmission over the wireless communications channel.

In example 25, the method of example 24 is provided, comprising: initiating, at a time R before the start of the DMTC window, a reservation signal over the wireless communications channel, wherein at least one of the CCA checks may begin sensing the wireless communications channel at a time R+C before the start of the DMTC window, and wherein C is a minimum sensing period for the wireless communications channel.

In example 26, the method of example 24 is provided, wherein at least one of the CCA checks may begin sensing the wireless communications channel at a time C prior to the start of the DMTC window, and wherein C is a minimum sensing period for the wireless communications channel.

In example 27, the method of example 24 is provided, comprising: initiating a reservation signal over the wireless communications channel before the DRS transmission, wherein at least one of the CCA checks may begin sensing the wireless communications channel at a time N before the start of the DMTC window, and wherein N is a random duration uniformly generated between 0 ms and 1 ms.

In example 28, the method of any of examples 24 through 27 is provided, wherein the DRS transmission may be initiated in a predetermined sub-frame within the DMTC window.

In example 29, the method of any of examples 24 through 27 is provided, wherein the set of one or more CCA checks may include a plurality of CCA checks, and the DRS transmission is initiated on any of a plurality of continuous sub-frames within the DMTC window.

In example 30, the method of examples 24 through 27 is provided, wherein the set of one or more CCA checks may include a plurality of CCA checks, and the DRS transmission may be initiated on any of a plurality of spaced sub-frames within the DMTC window.

In example 31, the method of examples 24 through 30 is provided, which may comprise: determining a downlink (DL) burst time window; and initiating a DRS transmission through an antenna coupled to an antenna port of the eNB within the DL burst time window.

Example 32 provides machine readable storage media having machine executable instructions stored thereon that, when executed, may cause one or more processors to perform a method according to any one of examples 24 through 31.

Example 33 provides machine readable storage media having machine executable instructions that, when executed, may cause one or more processors to perform an operation comprising: determine, for an Evolved Node-B (eNB), a Discovery Measurement Timing Configuration (DMTC) window for a wireless communications channel and a DRS occasion within the DMTC window; initiate a set of one or more Clear Channel Assessment (CCA) checks of the wireless communications channel; and initiate, within the DMTC window, and upon any CCA check of the set of one or more CCA checks sensing that the wireless communication channel is idle, a Discovery Reference Signal (DRS) transmission over the wireless communications channel.

In example 34, the machine readable storage media of example 33 is provided, having machine executable instructions that, when executed, cause the one or more processors to perform an operation comprising: initiate, at a time R before the start of the DMTC window, a reservation signal over the wireless communications channel, wherein at least one of the CCA checks may begin sensing the wireless communications channel at a time R+C before the start of the DMTC window, and wherein C is a minimum sensing period for the wireless communications channel.

In example 35, the machine readable storage media of example 33 is provided, wherein at least one of the CCA checks may begin sensing the wireless communications channel at a time C prior to the start of the DMTC window, and wherein C is a minimum sensing period for the wireless communications channel.

In example 36, the machine readable storage media of example 33 is provided, having machine executable instructions that, when executed, cause the one or more processors to perform an operation comprising: initiate a reservation signal over the wireless communications channel before the DRS transmission, wherein at least one of the CCA checks may begin sensing the wireless communications channel at a time N before the start of the DMTC window, and wherein N may be a random duration uniformly generated between 0 ms and 1 ms.

In example 37, the machine readable storage media of any of examples 33 through 36 may be provided, wherein the DRS transmission may be initiated in a predetermined sub-frame within the DMTC window.

In example 38, the machine readable storage media of any of examples 33 through 36 may be provided, wherein the set of one or more CCA checks may include a plurality of CCA checks, and the DRS transmission may be initiated on any of a plurality of continuous sub-frames within the DMTC window.

In example 39, the machine readable storage media of any of examples 33 through 36 is provided, wherein the set of one or more CCA checks may include a plurality of CCA checks, and the DRS transmission may be initiated on any of a plurality of spaced sub-frames within the DMTC window.

In example 40, the machine readable storage media of any of examples 33 through 39 is provided, having machine executable instructions that, when executed, cause the one or more processors to perform an operation comprising: determine a downlink (DL) burst time window; and initiate a DRS transmission through an antenna coupled to an antenna port of the eNB within the DL burst time window.

Example 41 provides an Evolved Node-B (eNB) operable to communicate with a User Equipment (UE) on a network, the eNB including hardware processing circuitry that may comprise: means for determining, for an Evolved Node-B (eNB), a Discovery Measurement Timing Configuration (DMTC) window for a wireless communications channel and a DRS occasion within the DMTC window; means for initiating a set of one or more Clear Channel Assessment (CCA) checks of the wireless communications channel; and means for initiating, within the DMTC window, and upon any CCA check of the set of one or more CCA checks sensing that the wireless communication channel is idle, a Discovery Reference Signal (DRS) transmission over the wireless communications channel.

In example 42, the eNB of example 41 is provided, comprising: means for initiating, at a time R before the start of the DMTC window, a reservation signal over the wireless communications channel, wherein at least one of the CCA checks may begin sensing the wireless communications channel at a time R+C before the start of the DMTC window, and wherein C may be a minimum sensing period for the wireless communications channel.

In example 43, the eNB of example 41 is provided, wherein at least one of the CCA checks may begin sensing the wireless communications channel at a time C prior to the start of the DMTC window, and wherein C may be a minimum sensing period for the wireless communications channel.

In example 44, the eNB of example 41 is provided, comprising: means for initiating a reservation signal over the wireless communications channel before the DRS transmission, wherein at least one of the CCA checks may begin sensing the wireless communications channel at a time N before the start of the DMTC window, and wherein N may be a random duration uniformly generated between 0 ms and 1 ms.

In example 45, the eNB of any of examples 41 through 44 is provided, wherein the DRS transmission may be initiated in a predetermined sub-frame within the DMTC window.

In example 46, the eNB of any of examples 41 through 44 is provided, wherein the set of one or more CCA checks may include a plurality of CCA checks, and the DRS transmission may be initiated on any of a plurality of continuous sub-frames within the DMTC window.

In example 47, the eNB of examples 41 through 44 is provided, wherein the set of one or more CCA checks may include a plurality of CCA checks, and the DRS transmission may be initiated on any of a plurality of spaced sub-frames within the DMTC window.

In example 48, the eNB of examples 41 through 47 is provided, comprising: means for determining a downlink (DL) burst time window; and means for initiating a DRS transmission through an antenna coupled to an antenna port of the eNB within the DL burst time window.

Example 49 provides an Evolved Node-B (eNB) operable to communicate with a User Equipment (UE) on a network, the eNB including hardware processing circuitry that may comprise an antenna port, a first circuitry, and a second circuitry. The antenna port may be operable to provide Discovery Reference Signal (DRS) transmissions over a wireless communication channel. The first circuitry may be operable to determine a Discovery Measurement Timing Configuration (DMTC) window of the wireless communications channel and a DMTC start time within the DMTC window. The second circuitry may be operable to initiate a DRS transmission through an antenna coupled to the antenna port upon the DMTC start time.

In example 50, the eNB of example 49 is provided, wherein the DMTC start time may be equal to I*mod (ID, N), and wherein I may be a length of a DRS search interval, ID may be a number identifying the eNB, and N may be a number of DMTC start time locations within the DMTC window.

In example 51, the eNB of example 50 is provided, wherein ID may be a Physical Cell Identity (PCID).

In example 52, the eNB of either of examples 50 or 51 is provided, wherein N may be equal to P/I, and wherein P may be a length of the DMTC window.

Example 53 provides a system that may comprise a memory, a processor coupled to the memory, and an interface for allowing the processor to communicate with another device, the processor including the eNB of any of examples 49 through 52.

Example 54 provides an Evolved Node-B (eNB) configured to communicate with a User Equipment (UE) on a network, which may comprise: an antenna port, a timer, and a signaling circuitry. The antenna port may be operable to provide transmissions to the UE over a wireless communication channel. The timer may be operable to determine a Discovery Measurement Timing Configuration (DMTC) window of the wireless communications channel and a DMTC start time within the DMTC window. The signaling circuitry may be operable to initiate, upon the DMTC start time, a Discovery Reference Signal (DRS) transmission over the wireless communications channel.

In example 55, the eNB of example 54 is provided, wherein the DMTC start time may be equal to I*mod (ID, N), and wherein I may be a length of a DRS search interval, ID may be a number identifying the eNB, and N is a number of DMTC start time locations.

In example 56, the eNB of example 55 is provided, wherein ID may be a Physical Cell Identity (PCID).

In example 57, the eNB of either of examples 55 or 56 is provided, wherein N may be equal to P/I, and wherein P may be a length of the DMTC window.

Example 58 provides a system that may comprise a memory, a processor coupled to the memory, and an interface for allowing the processor to communicate with another device, the processor including the eNB of any of examples 54 through 57.

Example 59 provides a method performed by an Evolved Node-B (eNB) to communicate with a User Equipment (UE) on a network, which may comprise: determining, for an Evolved Node-B (eNB), a Discovery Measurement Timing Configuration (DMTC) window for a wireless communications channel and a DMTC start time within the DMTC window; and initiating a Discovery Reference Signal (DRS) transmission through an antenna coupled to an antenna port of the eNB upon the DMTC start time within the DMTC window.

In example 60, the method of example 59 is provided, wherein the DMTC start time may be equal to I*mod (ID, N), and wherein I may be a length of a DRS search interval, ID may be a number identifying the eNB, and N may be a number of DMTC start time locations.

In example 61, the method of example 60 is provided, wherein ID may be a Physical Cell Identity (PCID).

In example 62, the method of either of examples 60 or 61 is provided, wherein N may be equal to P/I, and wherein P may be a length of the DMTC window.

Example 63 provides machine readable storage media having machine executable instructions stored thereon that may, when executed, cause one or more processors to perform a method according to any one of examples 59 through 62.

Example 64 provides machine readable storage media having machine executable instructions that, when executed, cause one or more processors to perform an operation that may comprise: determine, for an Evolved Node-B (eNB), a Discovery Measurement Timing Configuration (DMTC) window for a wireless communications channel and a DMTC start time within the DMTC window; and initiate a Discovery Reference Signal (DRS) transmission through an antenna coupled to an antenna port of the eNB upon the DMTC start time within the DMTC window.

In example 65, the machine readable storage media of example 64 is provided, wherein the DMTC start time may be equal to I*mod (ID, N), and wherein I may be a length of a DRS search interval, ID may be a number identifying the eNB, and N may be a number of DMTC start time locations.

In example 66, the machine readable storage media of example 65 is provided, wherein ID may be a Physical Cell Identity (PCID).

In example 67, the machine readable storage media of either of examples 65 or 66 is provided, wherein N may be equal to P/I, and wherein P may be a length of the DMTC window.

Example 68 provides an Evolved Node-B (eNB) operable to communicate with a User Equipment (UE) on a network, the eNB including hardware processing circuitry that may comprise: means for determining, for an Evolved Node-B (eNB), a Discovery Measurement Timing Configuration (DMTC) window for a wireless communications channel and a DMTC start time within the DMTC window; and means for initiating a Discovery Reference Signal (DRS) transmission through an antenna coupled to an antenna port of the eNB upon the DMTC start time within the DMTC window.

In example 69, the eNB of example 68 is provided, wherein the DMTC start time may be equal to I*mod (ID, N), and wherein I may be a length of a DRS search interval, ID may be a number identifying the eNB, and N may be a number of DMTC start time locations.

In example 70, the eNB of example 69 is provided, wherein ID may be a Physical Cell Identity (PCID).

In example 71, the eNB of either of examples 69 or 70 is provided, wherein N may be equal to P/I, and wherein P may be a length of the DMTC window.

Example 72 provides an Evolved Node-B (eNB) operable to communicate with a User Equipment (UE) on a network, the eNB including hardware processing circuitry that may comprise an antenna port, a first circuitry, a second circuitry, and a third circuitry. The antenna port may be operable to provide Discovery Reference Signal (DRS) transmissions over a wireless communication channel. A first circuitry may be operable to determine a DRS transmission time. A second circuitry may be operable to initiate a Physical Downlink Shared Channel (PDSCH) transmission through an antenna coupled to the antenna port. A third circuitry may be operable to puncture one or more of the final Orthogonal Frequency Division Multiplexing (OFDM) symbols of the PDSCH transmission.

In example 73, the eNB of examples 72 is provided, wherein the DRS transmission time may be in a Discovery Measurement Timing Configuration (DMTC) window.

In example 74, the eNB of example 73 is provided, wherein the DRS transmission time may be the start of the DMTC window.

In example 75, the eNB of any of examples 72 through 74, wherein the third circuitry may be operable to puncture the last three OFDM symbols of the PDSCH transmission.

Example 76 provides a system that may comprise a memory, a processor coupled to the memory, and an interface for allowing the processor to communicate with another device, the processor including the eNB of any of examples 72 through 75.

Example 77 provides an Evolved Node-B (eNB) configured to communicate with a User Equipment (UE) on a network, which may comprise an antenna port, a timer, a transmission circuitry, and a puncturing circuitry. The antenna port may be operable to provide transmissions to the UE over a wireless communication channel. The timer may be operable to determine a DRS transmission time. The transmission circuitry may be operable to initiate a Physical Downlink Shared Channel (PDSCH) transmission over the wireless communications channel. The puncturing circuitry may be operable to puncture one or more of the final Orthogonal Frequency Division Multiplexing (OFDM) symbols of the PDSCH transmission.

In example 78, the eNB of example 77 is provided, wherein the DRS transmission time may be in a Discovery Measurement Timing Configuration (DMTC) window.

In example 79, the eNB of example 78 is provided, wherein the DRS transmission time may be the start of the DMTC window.

In example 80, the eNB of any of examples 77 through 79 is provided, wherein the puncturing circuitry may be operable to puncture the last three OFDM symbols of the PDSCH transmission.

Example 81 provides a system that may comprise a memory, a processor coupled to the memory, and an interface for allowing the processor to communicate with another device, the processor including the eNB of any of examples 77 through 80.

Example 82 provides a method performed by an Evolved Node-B (eNB) to communicate with a User Equipment (UE) on a network, which may comprise: determining, for an Evolved Node-B (eNB), a Discovery Reference Signal (DRS) transmission time; initiating a Physical Downlink Shared Channel (PDSCH) transmission over the wireless communications channel; and puncturing one or more of the final Orthogonal Frequency Division Multiplexing (OFDM) symbols of the PDSCH transmission.

In example 83, the method of example 82 is provided, wherein the DRS transmission time may be in a Discovery Measurement Timing Configuration (DMTC) window.

In example 84, the method of example 83 is provided, wherein the DRS transmission time may be the start of the DMTC window.

In example 85, the method of any of examples 82 through 84 is provided, the last three OFDM symbols of the PDSCH transmission may be punctured.

Example 86 provides machine readable storage media having machine executable instructions stored thereon that, when executed, may cause one or more processors to perform a method according to any one of examples 82 through 85.

Example 87 provides machine readable storage media having machine executable instructions that, when executed, cause one or more processors to perform an operation that may comprise: determine, for an Evolved Node-B (eNB), a Discovery Reference Signal (DRS) transmission time; initiate a Physical Downlink Shared Channel (PDSCH) transmission over the wireless communications channel; and puncture one or more of the final Orthogonal Frequency Division Multiplexing (OFDM) symbols of the PDSCH transmission.

In example 88, the machine readable storage media of example 87 is provided, wherein the DRS transmission time may be in a Discovery Measurement Timing Configuration (DMTC) window.

In example 89, the machine readable storage media of example 88 is provided, wherein the DRS transmission time may be the start of the DMTC window.

In example 90, the machine readable storage media of any of examples 87 through 89 is provided, the last three OFDM symbols of the PDSCH transmission may be punctured.

Example 91 provides an Evolved Node-B (eNB) operable to communicate with a User Equipment (UE) on a network, the eNB including hardware processing circuitry that may comprise: means for determining, for an Evolved Node-B (eNB), a Discovery Reference Signal (DRS) transmission time; means for initiating a Physical Downlink Shared Channel (PDSCH) transmission over the wireless communications channel; and means for puncturing one or more of the final Orthogonal Frequency Division Multiplexing (OFDM) symbols of the PDSCH transmission.

In example 92, the eNB of example 91 is provided, wherein the DRS transmission time may be in a Discovery Measurement Timing Configuration (DMTC) window.

In example 93, the eNB of example 92 is provided, wherein the DRS transmission time may be the start of the DMTC window.

In example 94, the eNB of any of examples 91 through 93 is provided, the last three OFDM symbols of the PDSCH transmission may be punctured.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A base station operable to communicate with a User Equipment (UE) on a network, the base station including hardware processing circuitry comprising:
   an antenna port operable to provide Discovery Reference Signal (DRS) transmissions over a wireless communication channel, and operable to provide Clear Channel Assessment (CCA) checks of the wireless communications channel;
   a first circuitry operable to:
   determine a Discovery Measurement Timing Configuration (DMTC) window of the wireless communications channel; and
   determine a start of at least one of the CCA checks of a set of one or more CCA checks based on a DRS occasion of a plurality of DRS occasions, wherein the plurality of DRS occasions are predetermined time points within the DMTC window;
   a second circuitry operable to initiate, prior to a start of the DRS occasion within the DMTC window, the set of one or more CCA checks through an antenna coupled to the antenna port; and
   a third circuitry operable to initiate a DRS transmission through the antenna at the start of the DRS occasion within the DMTC window upon any CCA check of the set of one or more CCA checks sensing that the wireless communication channel is idle,
   wherein the start of the at least one of the CCA checks is a time N before the start of the DRS occasion,
   wherein the time N is randomly generated within a specified time duration,
   wherein the specified time duration is between 0 ms, and
   wherein the third circuitry is operable to initiate a reservation signal before the DRS transmission and after completion of the sensing for the time N.

2. The base station of claim 1, wherein at least one of the CCA checks includes sensing the channel for a specified duration, and wherein an idle condition is sensed by one of the CCA checks when an energy received is less than a predetermined energy detection (ED) threshold for the CCA check.

3. The base station of claim 2, wherein the predetermined ED threshold is set to a value substantially the same as an ED threshold used for CCA checks for downlink (DL) data burst transmissions.

4. The base station of claim 2, wherein the predetermined ED threshold is set to a value less than an ED threshold used for CCA checks for downlink (DL) data burst transmissions.

5. The base station of claim 2, wherein the predetermined ED threshold is set to a value between approximately −62 dBm and approximately −67 dBm.

6. The base station of claim 1, wherein at least one of the CCA checks begins sensing the wireless communications channel at a time C+R before the start of the DRS occasion, wherein C is a minimum sensing period for the wireless communications channel, wherein R is a reservation signal transmission time, and wherein the third circuitry is operable to initiate a reservation signal transmission through the antenna at a time R before the start of the DRS occasion.

7. The base station of claim 1, wherein at least one of the CCA checks begins sensing the wireless communications channel at a time C prior to the start of the DRS occasion, wherein C is a minimum sensing period for the wireless communications channel.

8. The base station of claim 1, wherein the DRS transmission is initiated in a predetermined sub-frame within the DMTC window.

9. The base station of claim 1, wherein the set of one or more CCA checks includes a plurality of CCA checks, and the DRS transmission is initiated on any of a plurality of consecutive sub-frames within the DMTC window.

10. The base station of claim 1, wherein the set of one or more CCA checks includes a plurality of CCA checks, and the DRS transmission is initiated on any of a plurality of periodically spaced sub-frames within the DMTC window.

11. A base station configured to communicate with a User Equipment (UE) on a network, the base station comprising:
   an antenna port operable to provide transmissions to the UE over a wireless communications channel;
   a timer operable to determine a Discovery Measurement Timing Configuration (DMTC) window of the wireless communications channel, and operable to determine a Listen-Before-Talk (LBT) starting time prior to a start of a Discovery Reference Signal (DRS) occasion of a plurality of DRS occasions within the DMTC window, wherein the plurality of the DRS occasions are predetermined time points within the DMTC window;
   a sensing circuit operable to initiate, at the LBT starting time, a set of one or more Clear Channel Assessment (CCA) checks of the wireless communications channel; and
   a signaling circuitry operable to initiate, within the DMTC window, and upon any CCA check of the set of one or more CCA checks sensing that the wireless communication channel is idle, a DRS transmission over the wireless communications channel,
   wherein at least one of the CCA checks begins sensing the wireless communications channel at a time N before the start of the DRS occasion,
   wherein the time N is randomly generated within a specified time duration,
   wherein the specified time duration is between 0 ms and 1 ms, and
   wherein the signaling circuitry is operable to initiate a reservation signal before the DRS transmission and after completion of the sensing for the time N.

12. The base station of claim 11, wherein at least one of the CCA checks begins sensing the wireless communications channel at a time R+C before the start of the DRS occasion, wherein C is a minimum sensing period for the wireless communications channel, wherein R is a reservation signal transmission time, and wherein the signaling circuitry is operable to initiate a reservation signal transmission through an antenna coupled to the antenna port at a time R before a start of the DMTC window.

13. The base station of claim 11, wherein at least one of the CCA checks begins sensing the wireless communications channel at a time C prior to the start of the DRS occasion, wherein C is a minimum sensing period for the wireless communications channel.

14. The base station of claim 11, wherein the DRS transmission is initiated in a predetermined sub-frame within the DMTC window.

15. The base station of claim 11, wherein the set of one or more CCA checks includes a plurality of CCA checks, and the DRS transmission is initiated on any of a plurality of consecutive sub-frames within the DMTC window.

16. The base station of claim 11, wherein the set of one or more CCA checks includes a plurality of CCA checks, and the DRS transmission is initiated on any of a plurality of periodically spaced sub-frames within the DMTC window.

17. The base station of claim 11, wherein at least one of the CCA checks includes sensing the channel for the specified time duration, and wherein an idle condition is sensed by one of the CCA checks when an energy received is less than a predetermined energy detection (ED) threshold for the CCA check.

18. The base station of claim 17, wherein the predetermined ED threshold is set to a value substantially the same as an ED threshold used for CCA checks for downlink (DL) data burst transmissions.

19. Machine readable non-transitory storage media having machine executable instructions that, when executed, cause one or more processors to perform operations comprising:
    determining, for a base station, a Discovery Measurement Timing Configuration (DMTC) window for a wireless communications channel and a Discovery Reference Signal (DRS) occasion of a plurality of DRS occasions within the DMTC window, wherein the plurality of the DRS occasions are predetermined time points within the DMTC window;
    initiating a set of one or more Clear Channel Assessment (CCA) checks of the wireless communications channel;
    initiating, within the DMTC window, and upon any CCA check of the set of one or more CCA checks sensing that the wireless communication channel is idle, a DRS transmission over the wireless communications channel; and
    initiating a reservation signal over the wireless communications channel before the DRS transmission,
    wherein at least one of the CCA checks begins sensing the wireless communications channel at a time N before a start of the DMTC window,
    wherein the time N is randomly generated within a specified time duration, and
    wherein the specified time duration is between 0 ms and 1 ms.

20. The machine readable non-transitory storage media of claim 19, the operations further comprising:
    initiating, at a time R before the start of the DMTC window, a reservation signal over the wireless communications channel,
    wherein at least one of the CCA checks begins sensing the wireless communications channel at a time R+C before the start of the DMTC window, and wherein C is a minimum sensing period for the wireless communications channel.

21. The machine readable non-transitory storage media of claim 19, wherein at least one of the CCA checks begins sensing the wireless communications channel at a time C prior to the start of the DMTC window, and wherein C is a minimum sensing period for the wireless communications channel.

22. The machine readable non-transitory storage media of claim 19, wherein the DRS transmission is initiated in a predetermined sub-frame within the DMTC window.

23. The machine readable non-transitory storage media of claim 19, wherein the set of one or more CCA checks includes a plurality of CCA checks, and the DRS transmission is initiated on any of a plurality of continuous sub-frames within the DMTC window.

24. The machine readable non-transitory storage media of claim 19, wherein the set of one or more CCA checks includes a plurality of CCA checks, and the DRS transmission is initiated on any of a plurality of spaced sub-frames within the DMTC window.

25. The machine readable non-transitory storage media of claim 19, wherein at least one of the CCA checks includes sensing the channel for the specified time duration, and wherein an idle condition is sensed by one of the CCA checks when an energy received is less than a predetermined energy detection (ED) threshold for the CCA check.

* * * * *

UNITED STATES PATENT AND TRADEMARK OFFICE
CERTIFICATE OF CORRECTION

PATENT NO. : 11,102,814 B2
APPLICATION NO. : 15/745424
DATED : August 24, 2021
INVENTOR(S) : Abhijeet Bhorkar et al.

Page 1 of 1

It is certified that error appears in the above-identified patent and that said Letters Patent is hereby corrected as shown below:

In the Claims

Claim 1, Column 29, Line 25-26 "communication channel, and operable" should read --communications channel, and operable--.

Claim 1, Column 29, Line 46 "communication channel is idle," should read --communications channel is idle,--.

Claim 1, Column 29, Line 51 "wherein the specified time duration is between 0 ms, and" should read --wherein the specified time duration is between 0 ms and 1 ms, and--.

Claim 11, Column 30, Line 47 "communication channel is idle," should read --communications channel is idle,--.

Claim 19, Column 31, Line 43 "communication channel is idle," should read --communications channel is idle,--.

Signed and Sealed this
Nineteenth Day of April, 2022

Katherine Kelly Vidal
*Director of the United States Patent and Trademark Office*